(12) United States Patent
Fuhrmann

(10) Patent No.: US 7,447,624 B2
(45) Date of Patent: Nov. 4, 2008

(54) GENERATION OF LOCALIZED SOFTWARE APPLICATIONS

(75) Inventor: Nils Fuhrmann, Amelinghausen (DE)

(73) Assignee: Sun Microsystems, Inc., Menlo Park, CA (US)

( * ) Notice: Subject to any disclaimer, the term of this patent is extended or adjusted under 35 U.S.C. 154(b) by 571 days.

(21) Appl. No.: 10/304,198

(22) Filed: Nov. 26, 2002

(65) Prior Publication Data

US 2003/0126559 A1 Jul. 3, 2003

(30) Foreign Application Priority Data

| Nov. 27, 2001 | (EP) | ................................. 01128179 |
| May 10, 2002 | (EP) | ................................. 02010132 |
| May 10, 2002 | (EP) | ................................. 02010133 |

(51) Int. Cl.
G06F 17/20 (2006.01)
G06F 17/28 (2006.01)

(52) U.S. Cl. ............................. 704/8; 704/2; 715/264; 717/136

(58) Field of Classification Search ................ 717/112, 717/136; 715/512, 264; 704/8, 2
See application file for complete search history.

(56) References Cited

U.S. PATENT DOCUMENTS

| 5,434,776 A | 7/1995 | Jain |
| 5,551,055 A | 8/1996 | Matheny et al. |
| 5,664,206 A * | 9/1997 | Murow et al. .................. 704/8 |
| 5,675,803 A * | 10/1997 | Preisler et al. .............. 717/131 |
| 5,678,039 A | 10/1997 | Hinks et al. |
| 5,754,858 A * | 5/1998 | Broman et al. .............. 717/111 |

(Continued)

FOREIGN PATENT DOCUMENTS

| EP | 0 668 558 A1 | 8/1995 |
| EP | 1 014 262 A2 | 6/2000 |
| EP | 1 100 004 A2 | 5/2001 |

OTHER PUBLICATIONS

The Design of Distributed Hyperlinked Programming Documentation, Lisa Friendly, Sun Microsystems Inc, 1995, 25 pages.*
OpenWindowsDeveloper's Guide XViewCode Generator, Programmer's Guide, SunSoft Sun Microsystems Inc, 112 pages, Aug. 1994.*
Literate Programming Simplified, Norman Ramsey, IEEE Software, 1994, pp. 97-105.*

(Continued)

*Primary Examiner*—Patrick N. Edouard
*Assistant Examiner*—Lamont Spooner
(74) *Attorney, Agent, or Firm*—Sonnenschein Nath & Rosenthal LLP

(57) ABSTRACT

Methods, systems, and articles of manufacture provide a single multi-language source code file and effects single-language executable files from the multi-language source code file. A program extracts text elements in the first language from the source code. The extracted text elements include context information that identifies a location of the text element in the first language in the source code. Translations of the extracted text elements in a second language are obtained. The translations of the text elements in the second language are merged into the source code at merge locations based on the context information. Versions of the source code in the first language and the second language are then generated.

36 Claims, 18 Drawing Sheets

U.S. PATENT DOCUMENTS 5,813,019 A * 9/1998 Van De Vanter ............ 715/512
5,974,372 A    10/1999 Barnes et al.
5,974,568 A *  10/1999 McQueen .................... 714/38
6,029,002 A *  2/2000  Afifi et al. .................... 717/131
6,092,036 A *  7/2000  Hamann ........................ 704/8
6,199,195 B1 * 3/2001  Goodwin et al. ............. 717/104
6,782,529 B2 * 8/2004  Kumhyr ..................... 717/111

2003/0004703 A1 * 1/2003 Prabhakar et al. .............. 704/8

OTHER PUBLICATIONS

Syntactic and Semantic Checking in Lanaguge-Based Editing Systems, Robert Alan Balance, 1989, Whole manual.*
Donald A. Levine, "*POSIX Programmer's Guide*", Mar. 1994, pp. 193-206, USA XP002234910, IBSN 0-937175-73-0.

* cited by examiner

FIGURE 6

| 602 Viewer.xrb | 604 com.sun.star.viewer.JavaClient | RID_STR_CANCEL | 606 de | 608 abbrechen |
|---|---|---|---|---|
| 610 Viewer.xrb | 612 com.sun.star.viewer.JavaClient | RID_STR_CANCEL | 614 x-translate | 616 cancel |

| 602 viewer.xrb | 604 com.sun.star.viewer.JavaClient RID_STR_CANCEL | 606 de | 608 abbrechen |
|---|---|---|---|
| 610 viewer.xrb | 612 com.sun.star.viewer.JavaClient RID_STR_CANCEL | 614 x-translate | 616 cancel |
| 618 viewer.xrb | 620 com.sun.star.viewer.JavaClient RID_STR_CANCEL | 622 en-US | 624 cancel |
| 626 viewer.xrb | 628 com.sun.star.viewer.JavaClient RID_STR_CANCEL | 630 fr | 632 annuler |

621

| Key-ID | Language | Text | Status / Quality |
|---|---|---|---|
| 1 | 1 | The computer is standing on the table. | Untranslated |
| 1 | 1 | The computer is standing on the table | 100% |
| 1 | 1 | The computer is standing on the table[?] | 97% |
| 1 | 1 | [4] computer is standing on the table | 95% |
| 1 | 1 | [4] computer is standing on[4] table. | 84% |

Selecting the bold lined table element by user input.

| Key-ID | Language | Text | Status |
|---|---|---|---|
| 1 | 1 | The computer is standing on the table. | Untranslated |
| 1 | 1 | The computer is standing on the table. | 100% |
| 1 | 49 | Der Computer steht auf dem Tisch. | 100% |

Selecting the bold lined table element by user input.

| Key-ID | Language | Text | Status |
|---|---|---|---|
| 1 | 49 | Der Computer steht auf dem Tisch. | Fully translated |

| Key-ID | Language | Text | Status / Quality |
|---|---|---|---|
| 1 | 1 | The computer is standing on the table. | Untranslated |
| 1 | 1 | *A* *keyboard* is standing on the table. | 66% |
| 1 | 1 | *There* *is* *a* *keyboard* standing on the table*?* | 61% |

Selecting the bold lined table element by user input

52

| Key-ID | Language | Text | Status |
|---|---|---|---|
| 1 | 1 | The computer is standing on the table. | Untranslated |
| 1 | 1 | *A* *keyboard* is standing on the table. | 66% |
| 1 | 49 | *Eine* *Tastatur* steht auf dem Tisch. | 66% |

Editing the suggested translation by user input.

54

| Key-ID | Language | Text | Status |
|---|---|---|---|
| 1 | - | *THE* *COMPUTER* steht auf dem Tisch. | Partially Translated 66% |

Selecting the dotted bold lined table element for next smaller text elements by user input.

56

| Key-ID | Language | Text | Status |
|---|---|---|---|
| 127 | - | *THE* *COMPUTER* steht auf dem Tisch. | Partially Translated 66% |
| 127 | 1 | The computer | 100% |
| 127 | 49 | Der Computer | 100% |

Accepting or editing the translation suggestion by user input

58

| Key-ID | Language | Text | Status |
|---|---|---|---|
| 1 | 49 | Der Computer steht auf dem Tisch | Fully translated |

Transferring the new translations to the database

60

| Key-ID | Language | Text | Status |
|---|---|---|---|
| 114115 | 49 | Der Computer steht auf dem Tisch. | |
| 114115 | 1 | The computer is standing on the table | |

Fig. 18

GENERATION OF LOCALIZED SOFTWARE APPLICATIONS

CROSS-REFERENCE TO RELATED APPLICATIONS

This Application claims the benefit of the filing date and priority to the following foreign patent applications, all of which are incorporated herein by reference to the extent permitted by law:

European Patent Application serial No. 01128179.7, entitled "METHOD AND APPARATUS FOR LOCALIZING SOFTWARE", filed Nov. 27, 2001;

European Patent Application serial No. 02010132.5, entitled "AUTOMATIC IMAGE-BUTTON CREATION PROCESS", filed May 10, 2002; and European Patent Application serial No. 02010133.3, entitled "GENERATION OF LOCALIZED SOFTWARE APPLICATIONS", filed May 10, 2002.

Additionally, this Application is related to U.S. Patent Application, entitled "METHOD AND SYSTEM FOR AUTOMATIC CREATION OF MULTILINGUAL IMMUTABLE IMAGE FILES", which is filed concurrently with this Application, and is incorporated herein by reference to the extent permitted by law.

FIELD OF THE INVENTION

The present invention relates to computer programming, and in particular, relates to providing source code for displaying text elements in multiple languages.

BACKGROUND OF THE INVENTION

With continuously increasing processing capabilities of computers and increasing proliferation of computers in offices and homes, computers have become valuable tools that are used to perform a variety of tasks. For example, computers are widely used for office applications, imaging and video processing, personal communications, purchasing and sales, and information services.

Data processing devices for the above or other applications may include a variety of computing devices, including desktop or personal computers, lap-top computers, palm-top computers, personal digital assistants (PDA), and mobile communication devices such as mobile telephones or mobile communicators.

Further, a growing number of the applications described above involve communication networks that link a plurality of data processing devices. These individual data processing devices may be at arbitrary locations. Thus, a data processing device used to provide a service, such as a server maintaining data that can be accessed through a communication network, may be located at a first location, while another data processing device that uses the service, such as a client operated by a user who wants to retrieve the data from the server, may be located at a second, remote location. A server may be arranged to be accessed by a number of clients.

A user operating a client could connect to a server or network of servers using personal identification information, and input commands to access data maintained at the server or the network of servers. The personal information may be email, a text document, images or another type of information. For example, a user at a client could also access a server in a company-wide local-area network, and input commands to access, retrieve or manipulate data of the user's workgroup. The server could in turn provide desired information for display at the client.

This exchange of information between clients and servers is enabled by a computer program that provides access and control of data at the server. For example, a text processing program can access a text document, and an email program can access email.

To maintain privacy and to provide a user with control of the computer program, each user launches an instance of the computer program at the server (i.e., an instance of a service program) and controls execution of the service program through the client, for example, by inputting commands at the client. The service program at the server may be run in connection with or constitute at least part of an operating system that involves elements located at the server and at the client.

In the above exemplary cases, information from the service program can be displayed at the client for the user. This display of information may include, for example, the display of a screen with menu information, the presentation of message strings or notifications during the execution of the service program, or the display of another type of dialogue or information that allows the selection and manipulation of data and the execution and control of the service program.

For example, a text processing program displays a frame on a video display including command buttons, a region for displaying a text document, a region for displaying status information, and other kinds of information. During execution of the text processing program, the text processing program may inform the user about certain states of the data processing device, of the program, or of accessed data. For example, when data is being stored, the text processing program may prompt the user to make a selection of a format for storing data, to make a selection of a storage location, or may notify the user regarding the status of a storage device.

The service program an display information about controlling execution of the program or notifications, for example, using image buttons that contain text information. This text information may provide information, for example, about a specific function that can be activated when selecting the image button. A user can select the image button by clicking on the image button using a mouse and cursor device.

Regardless of whether the service program is executed on a stand-alone computer or on a plurality of data processing devices (e.g., in a client and server environment), it is possible that different users are located in different language areas or have different language preferences. Therefore, text information that is displayed to a user at a client should be provided in a language that is understood or preferred by that particular user. Accordingly, it is desirable to users that computer programs are offered in different languages or provide different language preferences that are selectable by a user, for example during installation of a computer program.

A conventional approach for providing a computer program that displays textual information in different languages, is to maintain different versions of the computer program's source code. In that case, each version of the source code contains text elements in a particular language, so that a particular version accommodates users with a particular language preference. The different version of the source code are then compiled to create executable versions of the computer program for the different languages. While this approach may be feasible in connection with smaller programs, maintaining different versions of larger programs or programs that have a large number of components (e.g., an operating system or a large service program) requires considerable resources. Also, since computer programs are subject to constant development with new versions being released to accommodate improvements or new functionality, under this conventional method, each version of the program's source code needs to be modified with each improvement. For example, if a service program is to be operable in twenty language environments, then twenty versions of the service program's source code need to be modified with each improvement under the conventional approach.

SUMMARY OF THE INVENTION

Methods, systems, and articles of manufacture consistent with the present invention provide single-language source code files in different languages from a source code file that initially contains text elements in a single language. The text elements are, for example, text strings or text formatting information. A localizer program extracts the text elements, which are in a first language, from the source code and obtains translations of the text elements in a second language. The extracted text elements include context information that identifies where they were extracted from the source code. Then, the localizer program merges the translated text elements into the source code at a location based on the context information. The source code therefore contains text elements in both languages. The localizer program then generates temporary single-language versions of the source code for both languages. These temporary single-language versions of the source code are individually sent to a compiler program to create single-language executable programs. After the temporary single-language versions of the source code are sent to the compiler, they can be deleted.

Accordingly, one multi-language version of the source code is maintained instead of a different single-language version for each language. When a developer wants to modify the source code, the developer modifies the single multi-language version of the source code. After the source code is modified and the localizer program generates the temporary single-language versions of the source code, a compiler program generates single-language executable programs in the various languages. Therefore, development of the source code is more efficient than with conventional methods because the single source code is modified instead of each single-language version of the source code.

For example, the source code is a base for a component that provides functionality, such as a word processing program like StarOffice® Writer, and contains text elements, such as menu items, in German for display on a video display. The source code is implemented in an XML™ (eXtensible Markup Language) file format that contains code that uses Java™ technology. When the source code developer wants to associate text elements in additional languages (e.g., English) with the source code, the developer initiates execution of the localizer program. The localizer program extracts the German text elements from the source code, obtains translations of the text elements in English, and merges the translated text elements into the source code. Then, the localizer program generates a temporary English-language version of the source code and a temporary German-language version of the source code. Since the single-language versions can be generated from the single source code, multiple versions of the source code do not need to be maintained. Sun Microsystems, Sun, the Sun logo, StarOffice, and Java are trademarks or registered trademarks of Sun Microsystems, Inc., Palo Alto, Calif., in the United States and other countries. XML is a trademark of Massachusetts Institute of Technology, Institut National de Recherche en Informatique et en Automatique, or Keio University on behalf of the World Wide Web Consortium. All other product names used herein may be trademarks of their respective companies.

In accordance with methods consistent with the present invention, a method in a data processing system having a program and a source code including a text element in a first language is provided. The method comprises the steps performed by the program of: extracting the text element in the first language from the source code, the extracted text element including context information that identifies a location of the text element in the first language in the source code; obtaining a translation of the extracted text element in a second language; merging the translation of the text element in the second language into the source code at a merge location based on the context information; and generating a version of the source code in the first language and a version of the source code in the second language.

In accordance with methods consistent with the present invention, a method in a data processing system having a program and a Java™ property file including a text element in English is provided. The method comprises the steps performed by the program of: creating an extensible markup language file; extracting the text element in English from the Java™ source code, the extracted text element including a context information that identifies a location of the text element in the English in the Java™ property file; writing the text element in English into the extensible markup language file; sending the text element in English to a translation program; receiving a translation of the text element in a different language from the translation program; merging the translation of the text element in the different language into the extensible markup language file at a merge location based on the context information; and generating a temporary Java™ property file in English that includes the text element in English and generating a temporary Java™ property file in the different language that includes the translation of the text element in the different language to effect an executable version of the extensible markup language file in English and an executable version of the extensible markup language file in the different language.

In accordance with articles of manufacture consistent with the present invention, a computer-readable medium containing instructions that cause a program, in a data processing system having a source code, to perform a method is provided. The method comprises comprising the steps of: extracting the text element in the first language from the source code, the extracted text element including context information that identifies a location of the text element in the first language in the source code; obtaining a translation of the extracted text element in a second language; merging the translation of the text element in the second language into the source code at a merge location based on the context information; and generating a version of the source code in the first language and a version of the source code in the second language.

In accordance with articles of manufacture consistent with the present invention, a computer-readable medium containing instructions that cause a program, in a data processing system having a Java™ property file including a text element in English, to perform a method is provided. The method comprises the steps of: creating an extensible markup language file; extracting the text element in English from the Java™ source code, the extracted text element including a context information that identifies a location of the text element in the English in the Java™ property file; writing the text element in English into the extensible markup language file; sending the text element in English to a translation program;

receiving a translation of the text element in a different language from the translation program; merging the translation of the text element in the second language into the extensible markup language file at a merge location based on the context information; and generating a temporary Java™ property file in English that includes the text element in English and generating a temporary Java™ property file in the different language that includes the translation of the text element in the second language to effect an executable version of the extensible markup language file in English and an executable version of the extensible markup language file in the different language.

In accordance with systems consistent with the present invention, a data processing system is provided. The data processing system comprises: a memory comprising a program that extracts a text element in a first language from a source code, the extracted text element including context information that identifies a location of the text element in the first language in the source code, obtains a translation of the extracted text element in a second language, merges the translation of the text element in the second language into the source code at a merge location based on the context information, and generating a version of the source code in the first language and a version of the source code in the second language; and a processing unit that runs the program.

In accordance with systems consistent with the present invention, a data processing system is provided. The data processing system comprises: means for extracting a text element in a first language from a source code, the extracted text element including context information that identifies a location of the text element in the first language in the source code; means for obtaining a translation of the extracted text element in a second language; means for merging the translation of the text element in the second language into the source code at a merge location based on the context information; and means for generating a version of the source code in the first language and a version of the source code in the second language.

In accordance with articles of manufacture consistent with the present invention, a computer-readable memory device encoded with a program having a data structure is provided. The program is run by a processor in a data processing system. The data structure comprises a source code having a text element in a first language, the text element including context information that identifies a location of the text element in the first language in the source code, wherein the program extracts the text element in the first language from the source code, obtains a translation of the text element in a second language, merges the translation of the text element in the second language into the source code at a merge location based on the context information, and generates a version of the source code in the first language and a version of the source code in the second language.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 6 depicts a block diagram of an intermediate file, in accordance with methods, systems, and articles of manufacture consistent with the present invention;

FIG. 7 depicts a block diagram of the intermediate file including translated text elements, in accordance with methods, systems, and articles of manufacture consistent with the present invention;

FIG. 16 depicts a block diagram of three illustrative user interaction interfaces that are displayed on the video display by the translator program during validation, in accordance with methods, system, and articles of manufacture consistent with the present invention;

FIG. 18 depicts another set of user interaction interfaces, in accordance with methods, system, and articles of manufacture consistent with the present invention;

DETAILED DESCRIPTION OF THE INVENTION

Figure 1:
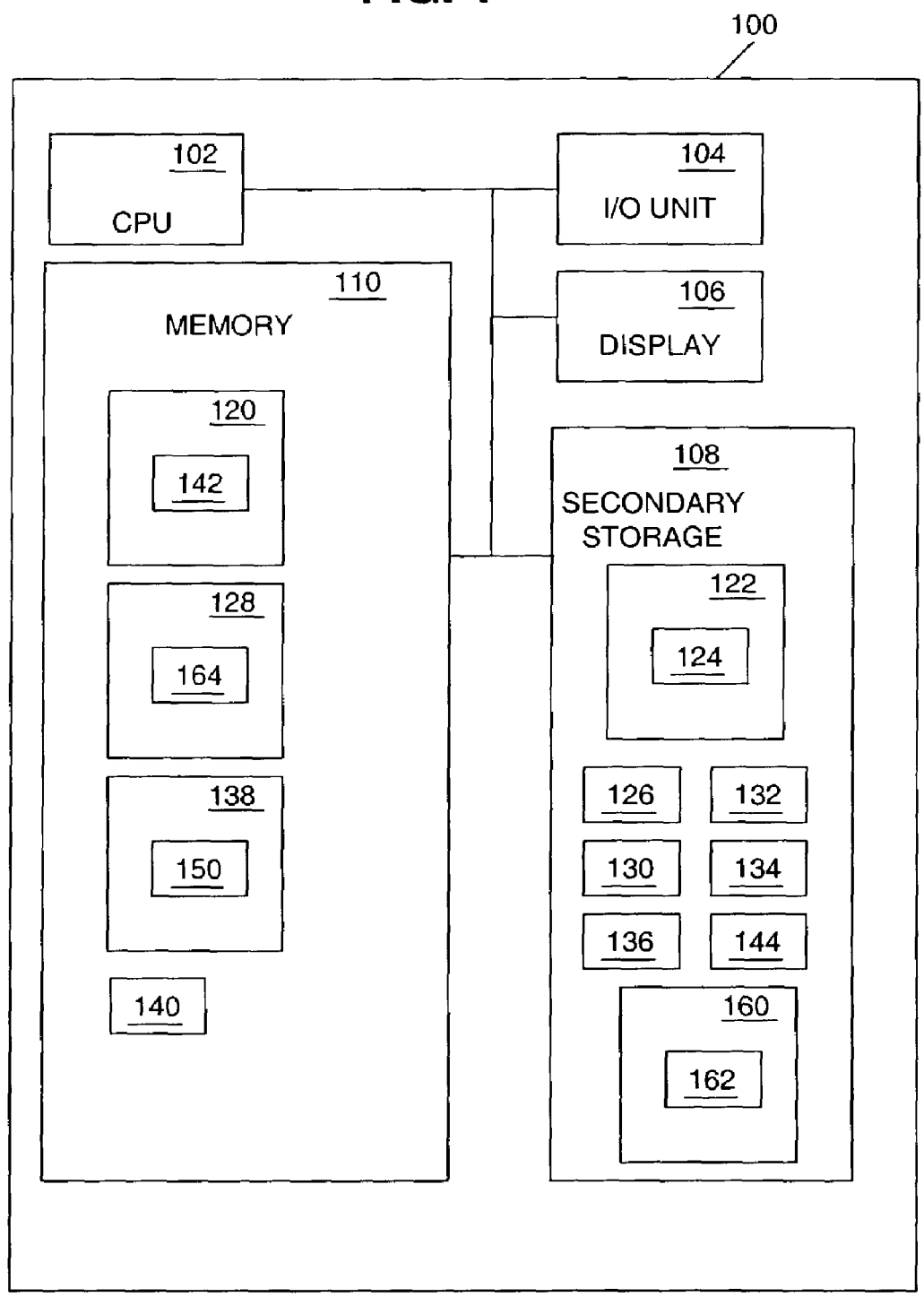
FIG. 1 depicts a block diagram of a data processing system suitable for use with methods and systems consistent with the present invention.

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention provide single-language executable files in different languages from a source code file that initially contains text elements, such as text strings, in a single language. A localizer program extracts the text elements from the source code and obtains translations of the text elements in a second language. The extracted text elements include context information that identifies where they were extracted from the source code. Then, the localizer program merges the translated text elements into the source code at a location based on the context information. The source code therefore contains text elements in both languages. The localizer program then generates temporary single-language versions of the source code for both languages. These temporary single-language versions of the source code are individually sent to a compiler program to create single-language executable programs. After the temporary single-language versions of the source code are sent to the compiler, they can be deleted.

Accordingly, unlike conventional methods, one multi-language version of the source code is maintained instead of a different single-language version for each language. When a developer wants to modify the source code, the developer modifies the single multi-language version of the source code. After the source code is modified and the localizer program generates the temporary single-language versions of the source code, the compiler program generates single-language executable programs in the various languages. Therefore, development of the source code is more efficient than with conventional methods because the single source code is modified instead of each single-language version of the source code.

In an illustrative example, the source code is a base for a word processing program, such as StarOffice® Writer, and contains text elements, such as menu items, in German for display on a video display. The source code is implemented in an eXtensible Markup Language (XML™) file format that contains code that uses Java™ technology. When the source code developer wants to associate text elements in additional languages (e.g., English) with the source code, the developer initiates execution of the localizer program. The localizer program extracts the German text elements from the source code, obtains translations of the text elements in English, and merges the translated text elements into the source code. Then, the localizer program effects generates an English-language version of the source code and a German-language version of the source code. Since the single-language versions can be generated from the single source code, multiple versions of the source code do not need to be maintained.

Referring to FIG. 1, FIG. 1 depicts a block diagram of a data processing system 100 suitable for use with methods and systems consistent with the present invention. Data processing system 100 comprises a central processing unit (CPU) 102, an input output I/O unit 104, display device 106, a secondary storage device 108, and a memory 110. Data processing system 100 may further comprise standard input devices such as a keyboard, a mouse or a speech processing means (each not illustrated).

Memory 110 contains a localizer program 120 for providing localized versions of a user program source code file 122 ("the source code") that contains one or more text elements 124 in a first language. As will be described in more detail below, the localizer program extracts text elements from the source code and stores them in an intermediate file 126. The localizer program then provides the intermediate file to a translation program 128 for translating the text elements into a second language or additional languages. The translation program returns the intermediate file with translated text elements in the second or additional languages to the localizer program, which merges the translated text elements into the source code so that the source code has text elements of multiple languages. Then, the localizer program generates temporary single-language versions of the source code 130 and 132 for each language.

The memory also contains a build program 138 and a compiler program 140. The build program, which can also be called a make program, sends the temporary single-language versions of the source code 130 and 132 to the compiler program, which generates single-language executable files 134 and 136 from the temporary single-language versions of the source code 130 and 132. After the build program sends the temporary single-language versions of the source code 130 and 132 to the compiler program, it deletes the temporary single-language versions of the source code 130 and 132. Accordingly, single language versions of the source code do not need to be maintained. The build can also initiate execution of the localizer program.

FIG. 1 depicts, as an illustrative example, two temporary single-language version 130 and 132 of the source code and two single-language executable files 134 and 136 in the secondary storage. Temporary single-language version of the source code 130 has, for example, English text elements and temporary single-language version of the source code 132 has text elements of a different language, such as German. Accordingly, single-language executable file 134 corresponds to the English temporary single-language version of the source code 130 and single-language executable file 136 corresponds to the German temporary single-language version of the source code 132. The localizer program can generate any number of temporary single-language versions of the source code corresponding to any number of languages. Each of these temporary single-language versions of the source code can then be made into an executable file.

The translation program is a program that is suitable for providing translations of text elements (e.g., text strings) into different languages, including translations of language-dependent symbols, characters, digits and formatting or layout information. The compiler is a program that is suitable for compiling the source code. For example, if the source code is implemented in C++, the compiler program is a C++ compiler program. Further, the compiler program may generate jar files, that is Java™ archives. Alternatively, the compiler program can be an interpreter program. The translation program and the compiler program are illustrated as being in the data processing system's memory 110, but they may alternatively be located remotely, such as in secondary storage 108 or at a remote location.

Each of the programs in memory 110 will be described in more detail below. The programs may comprise or may be included in one or more code sections containing instructions for performing their respective operations. While the programs are described as being implemented as software, the present implementation may be implemented as a combination of hardware and software or hardware alone. Also, one having skill in the art will appreciate that programs may comprise or may be included in a data processing device, which may be a client or a server, communicating with data processing system 100.

Figure 2:
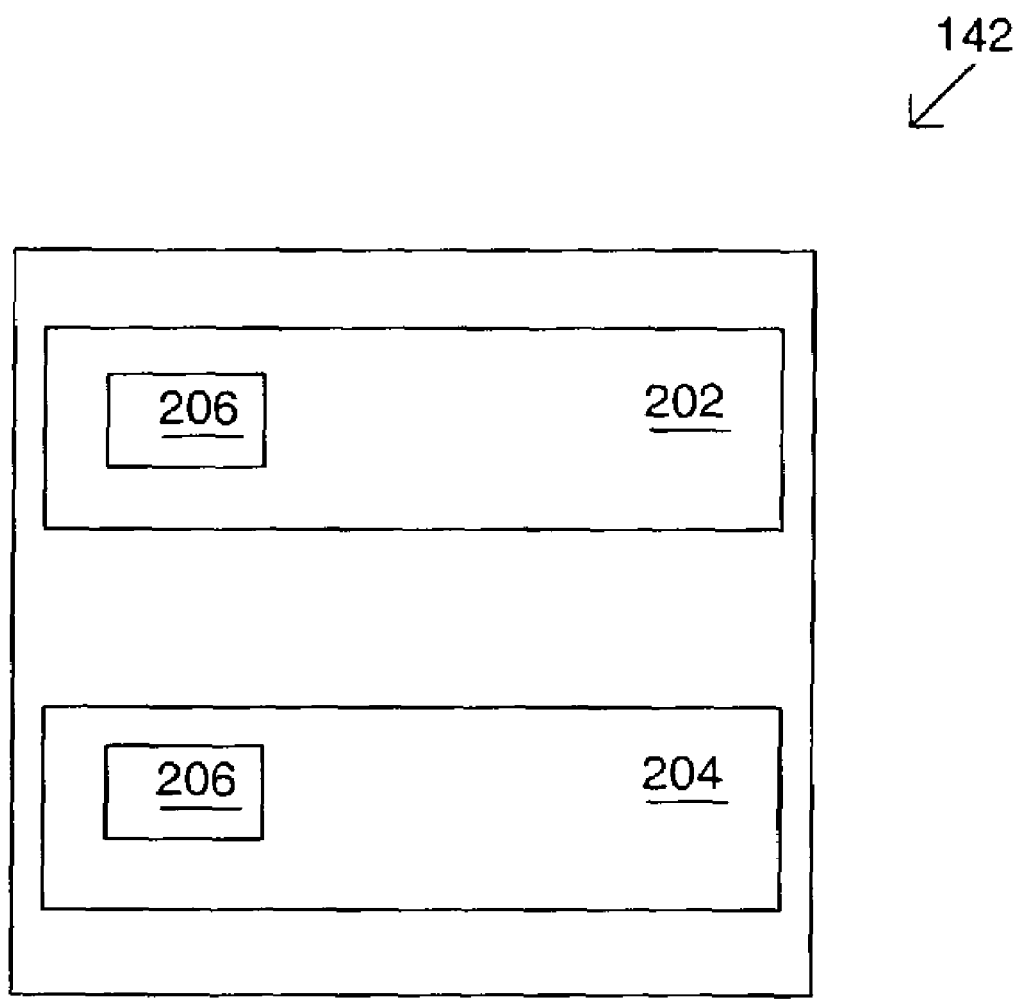
FIG. 2 depicts a block diagram of a data structure suitable for use with methods and systems consistent with the present invention.

The localizer program includes a data structure 124, which is shown in more detail in FIG. 2. Referring to FIG. 2, the data structure has an entry reflecting source code 142 having a text element 202 in a first language, the text element including a context information 206 that identifies a location of the text element in the first language in the source code, wherein the program extracts the text element in the first language from the source code, obtains a translation of the text element in a second language 204, merges the translation of the text element in the second language into the source code at a merge location based on the context information, and effects an executable version of the source code in the first language and an executable version of the source code in the second language.

Referring back to FIG. 1, secondary storage 108 includes user program source code 124 comprising one or more text elements 126. The secondary storage also contains intermediate file 126, temporary single-language versions 130 and 132 of the source code, and single-language executable files 134 and 136. The secondary storage can also contain a text element file 144, which will be described in more detail below.

The source code may be a base for any type of computer program, including for example, a text processing program, a spreadsheet program, an imaging or video processing program, an engineering program, a scientific program, a personal communication program, a personal organizer program, a banking program, a purchasing or sales program, or an information service program. The source code, however, is not limited to these types of programs. For example, the source code may be at least part of an operating system program. Further, the source code comprises one or more pieces of code that include elements of a programming language. Alternatively, the source code may include an intermediate language format, such as interpreted or pre-processed code, that has been prepared for providing an executable code. The source code can be implemented in any programming language, such as C or C++.

The source code includes the text elements, for example, to display text to a user of the data processing system. The text elements are in the form of text strings. Alternatively, the text elements can be in another form that permits them to be recognized by the localizer program within the source code. The text elements are language dependent and may be textual information, such as text, symbols, signs, or digits, or may include source code related to effecting language dependent presentation of textual information, such as format, layout, or size of a screen element that is associated with textual information. For example, a text element in the English language may appear on the display device in a horizontally-oriented field with text information presented from left to right. Another language, such as Japanese, may require a text element that designates text to have a vertical orientation, for arranging Kanji, Hiragana, or Katakana symbols in a top-down direction. Other languages may require text elements with text information to be displayed from a right position towards a left position on a screen, or another arrangement. Thus, the text element may include textual information as well as information on language-dependent appearance or layout. The source code can also include property keys, such as markers, that provide references to the text elements.

As stated above, the text element can comprise text, which can be any kind of text string or message, such as a menu item for display on the video display, a run time message for a user, help information, a help file, installation information, or another type of textual information. One having skill in the art will appreciate that source code 122, intermediate file 126, temporary single-language versions of the source code 130 and 132, and single-language executable files 134 and 136 can be located in a location other than the secondary storage, such as in memory or in a remote location, such as, on a server, or on a client.

Although aspects of aspects of methods, systems, and articles of manufacture consistent with the present invention are depicted as being stored in memory, one having skill in the art will appreciate that these aspects may be stored on or read from other computer-readable media, such as computer-readable storage media, like hard disks, floppy disks, and CD-ROM; or computer readable transmission media such as a carrier wave received from a network such as the Internet; or other forms of ROM or RAM either currently known or later developed. Further, although specific components of data processing system 100 have been described, one skilled in the art will appreciate that a data processing system suitable for use with methods, systems, and articles of manufacture consistent with the present invention may contain additional or different components.

Figure 3:
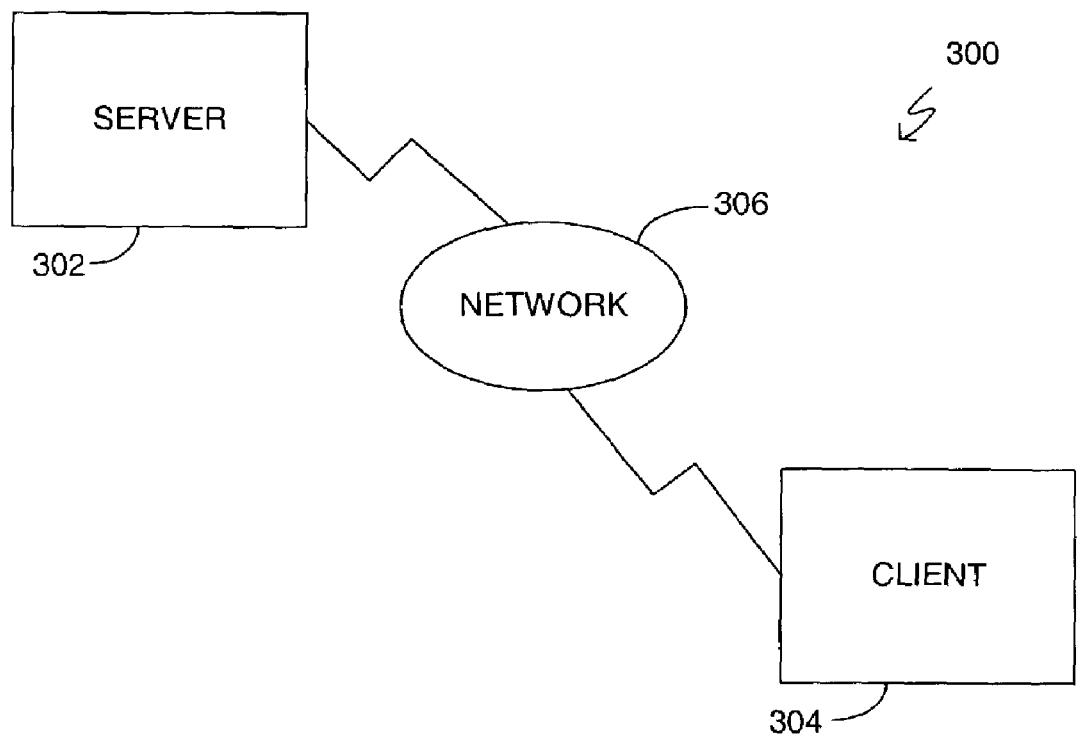
FIG. 3 depicts a block diagram of a client-server based data processing system suitable for use with methods and systems consistent with the present invention.

One having skill in the art will appreciate that methods, systems, and articles of manufacture consistent with the present invention may also be implemented in a client-server environment, like the one depicted in FIG. 3. FIG. 3 depicts a block diagram of a client-server based data processing system 300. A server 302 and a client 304 are each connected to a network 306, such as a Local Area Network, Wide Area Network, or the Internet. At least a portion of, for example, the localizer program can be stored on the client, while some or all steps of the processing as described below can be carried out on the server, which is accessed by the client over the network. The client and server can each comprise components similar to those described above with respect to data processing system 100, such as a CPU, an I/O, a memory, a secondary storage, and a display device.

In the illustrative example, the source code is a base for a word processing program and contains text elements, such as menu items, in German for display on the video display. When the source code developer wants to associate text elements in additional languages (e.g., English) with the source code, the developer initiates execution of the localizer program on the data processing system. The build program can also be used to initiate execution of the localizer program, as described below. The exemplary steps performed by the localizer program are described below with reference to FIG. 4.

Figure 4:
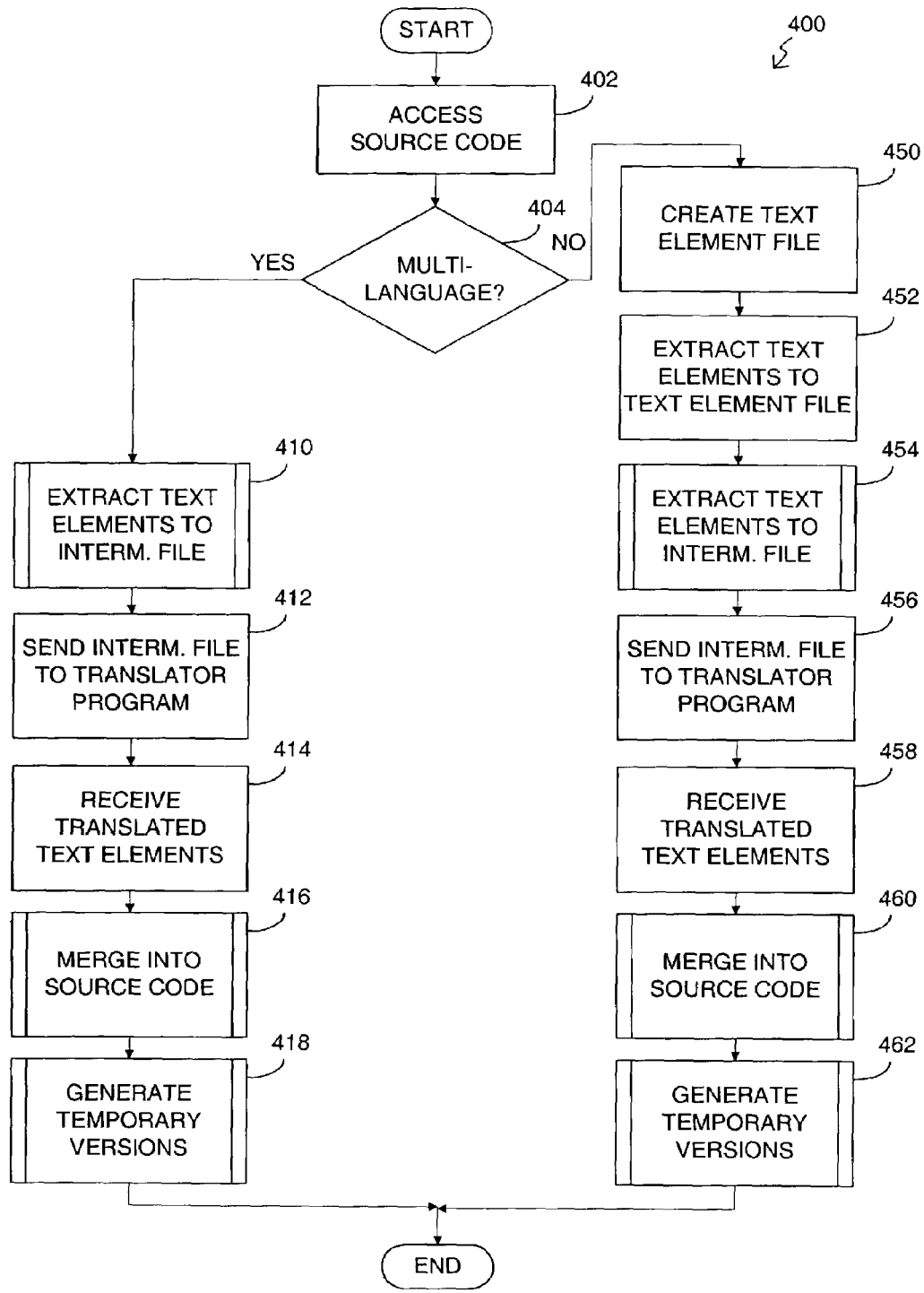
FIG. 4 depicts a flow diagram illustrating exemplary steps performed by the localizer program for associating text elements that are in different languages with the source code, in accordance with methods, systems, and articles of manufacture consistent with the present invention.

Referring to FIG. 4, FIG. 4 depicts a flow diagram 400 illustrating exemplary steps performed by the localizer program for associating text elements that are in different languages with the source code. One having skill in the art will appreciate that the source code can support either text elements of one language, such as a Java™ property file, or text elements of multiple languages, such as an XML™ (eXtensible Markup Language) file. The localizer program accommodates for both of these types of source code as described below.

In either case, instead of maintaining different version of the source code for each of the different languages, the localizer program provides a single multi-language source code that is associated with the text elements in the different languages. Thus, unlike conventional localization methods, it is not necessary to maintain a different version of the source code for each language. If the developer then needs to modify the source code, the developer modifies this single version of the source code, as opposed the conventional method of modifying the various versions of the source code that are in the different languages.

In FIG. 4, first, the conversion program accesses the source code by opening source code file 124 (step 402). The source code contains text elements of a first language, such as English. Also, the source code file may comprise a plurality of file elements, such as code segments that are located in different files that are stored at arbitrary locations. The localizer program accesses each of these file elements.

The localizer program then determines whether the source code is a multi-language source code or a single language source code (step 404). The localizer program does this, for example, by reading the source code file extension. For example, if the source code file has the extension "properties", the localizer program determines that the source code file is a single-language source code file. In another example, if the source code file extension has the extension "xml", the localizer program determines that the source code file is a multi-language source file.

If the localizer program determines that the source code is a multi-language source code in step 404, then the localizer program extracts the text elements in the first language from the source code and inserts them into intermediate file 126 (step 410). A more detailed depiction of step 404 is shown in FIG. 5.

Figure 5:
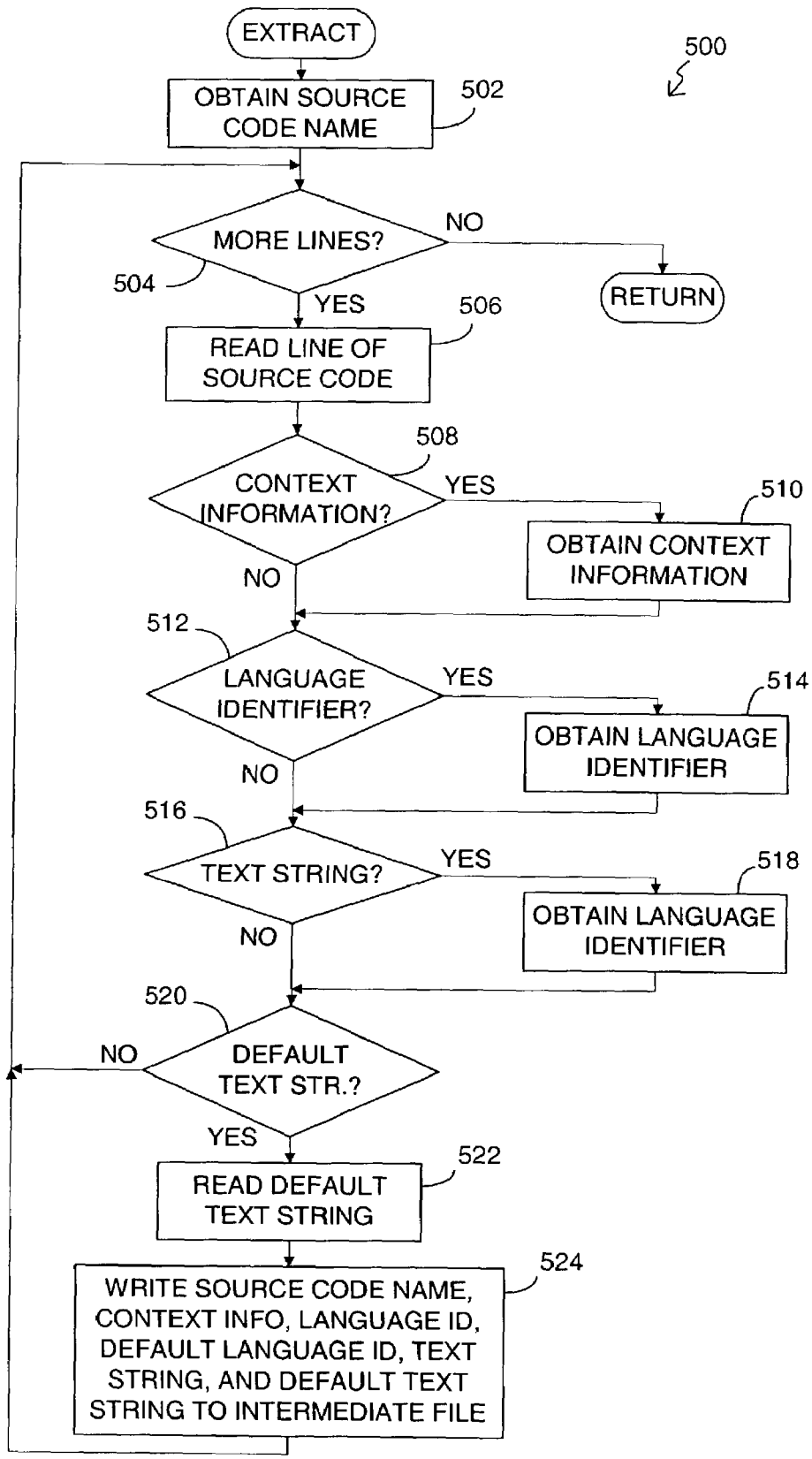
FIG. 5 depicts a flow diagram 500 illustrating the exemplary steps performed by the localizer program for extracting text elements from the source code and writing the text elements into the intermediate file, in accordance with methods, systems, and articles of manufacture consistent with the present invention.

Referring to FIG. 5, FIG. 5 depicts a flow diagram 500 illustrating the exemplary steps performed by the localizer program for extracting text elements from the source code and writing the text elements into the intermediate file. The text elements that are written into the intermediate file include text strings, as well as, context information that is used by the localizer program to identify where the text strings are located in the source code. Therefore, as will be described below, after the localizer program receives the intermediate file back from the translation program with the translated text elements, the localizer program is able to insert the translated text elements into the source code at the correct location based on the context information.

For illustrative purposes, a portion of a sample XML™ file (i.e., a type of multi-language source code file) named "viewer.xrb" is shown below. This sample XML™ file will be referred to as an illustrative example in the description that follows, however, one having skill in the art will appreciate that methods, systems, and articles of manufacture consistent with the present invention are not limited thereto or to an XML-type source code file.

```
<?xml version="1.0" encoding="UTF-8"?>
<ResourceBundle package="com.sun.star.viewer">
```

-continued

```
    <Context name="JavaClient">
        <Key id="RID_STR_CANCEL">
            <Text xml:lang="de">abbrechen</Text>
            <Text xml:lang="x-translate">cancel</Text>
        </Key>
        <Key id="RID_STR_PASSWORD">
            <Text xml:lang="de">passwort</Text>
            <Text xml:lang="x-translate">password</Text>
        </Key>
    </Context>
</ResourceBundle>
```

In FIG. 5, first, the localizer program obtains the name of the source code file, for example, by receiving a user input containing the source code file name (step 502). In the illustrative example, the source code's name is "viewer.xrb".

Then, the localizer program determines whether there is another line of source code from which to extract text elements (step 504). If the localizer program determines that there is another line of source code in step 504, then the localizer program reads that line of source code (step 506). The localizer program analyzes the line of source code to determine whether there is context information (step 508). In the illustrative, the lines

```
<ResourceBundle package="com.sun.star.viewer">
    <Context name="JavaClient">
        <Key id="RID_STR_CANCEL">
``` contain context information that, respectively, identify a ResourceBundle name "com.sun.star.viewer", a context name "JavaClient", and a key id name "RID_STR_CANCEL". There is a unique key id for each text element. Initially, the localizer program reads the first of these three lines and obtains the context information, that is, the localizer program obtains "com.sun.star.viewer" (step 510).

If the localizer program determines that the line of source code does not contain context information in step 508, or after having obtained context information in step 510, then the localizer program determines whether the line of source code contains a language identifier (step 512). The language identifier identifies a language associated with a text element, and can be any suitable identifier. For example, the language identifier can be "en_us" for English (United States) or "de" for German. Alternatively, the language identifier can use another convention, such as a numbering system, in which different languages are associated with different numbers. In this case, English, for example, can have the language identifier "01" and German can have the language identifier "33". The language identifier can also identify a default language, which is used by the localizer program in the event that the translation program cannot provide a translation for the text element of the first language. In the illustrative source code, the line

```
<Text xml:lang="de">abbrechen</Text>
``` contains the language identifier "de", which identifies the language German. Also, the line

```
<Text xml:lang="x-translate">cancel</Text>
``` contains the language identifier "x-translate", which identifies that a default text string follows.

If the localizer program determines that the line of source code contains a language identifier in step 512, then the localizer program obtains the language identifier (step 514). In the illustrative example, the localizer program obtains the language identifier "de".

After obtaining the language identifier in step 514, or after determining that the line does not contain a language identifier in step 512, the localizer program determines whether the line contains a text sting of a first language (step 516). If the line contains a text string, then the localizer program obtains the text string (step 518). In the illustrative source code, the term "abbrechen" that follows the language identifier "de" is a text string. Therefore, the localizer program obtains the text string "abbrechen".

If the localizer program determines in step 516 that the line does not contain a text string, or after obtaining a text string in step 518, then the localizer program determines whether the line contains a default text string (step 520). A default text string is a text string of a second language that can be used by the localizer program in the event that the translation program cannot provide a translation for the text element of the first language. If the line of source code contains a default text string, then the localizer program obtains the default text string (step 522). In the illustrative example, the line <Text xml: lang="x-translate">cancel</Text> contains the default text string "cancel".

If the localizer program determines that the line does not contain a default text string in step 520, then the localizer program returns to step 504 to obtain the next line of source code. Thus, the localizer program continues to search the lines of source code until it obtains the context information, the language identifier for the first language, the language identifier for the default language, the text string in the first language, and the default text string. After obtaining these text elements, the localizer program writes these text elements and the source code file name to the intermediate file.

Referring to FIG. 6, FIG. 6 depicts a block diagram of intermediate file 126. One having skill in the art will appreciate that the depicted intermediate file is merely illustrative that it can have a format other than that shown in FIG. 6. The intermediate file contains a first source code file name entry 602, a first context information entry 604, a first language identifier entry 606, and a first text string entry 608. In the illustrative intermediate file, the entries correspond to the text elements extracted from the illustrative source code file described above. Thus, first source code file name entry 602 identifies the source code file name "viewer.xrb", first context information entry 604 identifies the context information of the text string of the first language as "com.sun.star.viewer.JavaClient RID_STR_CANCEL", first language identifier entry 606 "de", and first text string entry 608 "abbrechen".

The second line of the intermediate file contains entries for the default language. Therefore, a second source code file name entry 610 and a second context information entry 612, correspond to entries 602 and 604, since the file name and the context information are the same. The second language identifier entry 614 identifies the default language identifier "x-translate" and the second default text string 616 is the default text string "cancel".

Referring back to FIG. 5, after the localizer program writes the entries into the intermediate file in step 524, the localizer program returns to step 504 to determine whether there are additional text elements. If there are more text elements in the source code, the localizer program adds additional lines to the intermediate file for each text string and its corresponding default text string.

Referring back to FIG. 4, after the localizer program creates the intermediate file in step 410, the localizer program sends the intermediate file to the translator program (step 412). The translator program is described in more detail below. Then, the localizer program receives the intermediate file back from the translator program with the translated text elements (step 414). In other words, when the intermediate file is returned from the translator program, it contains additional entries for text elements corresponding to additional languages.

After the localizer program sends the intermediate file to the translator program in step 412, the localizer can optionally delete the intermediate file from the secondary storage. Therefore, when the intermediate file is returned from the translator program in step 414, there is one version or one copy of the intermediate file in the secondary storage.

Referring to FIG. 7, FIG. 7 depicts a block diagram of intermediate file 126 after it has been received from the translator program in step 414 of FIG. 4. The intermediate file contains an additional line for each additional language. As depicted, the third line of the intermediate file contains a third language identifier entry 622 of "en_us", which identifies English (United States), and a third text string entry 624 of "cancel", which is the English translation of the first text string 608. One having skill in the art will appreciate that the intermediate file can contain additional lines for additional languages.

Referring back to FIG. 4, after the localizer program receives the intermediate program in step 414, the localizer program merges the translated text elements into the source code (step 416). A depiction of mapping text elements in the intermediate file to the source code is shown in FIG. 8.

Figure 8:
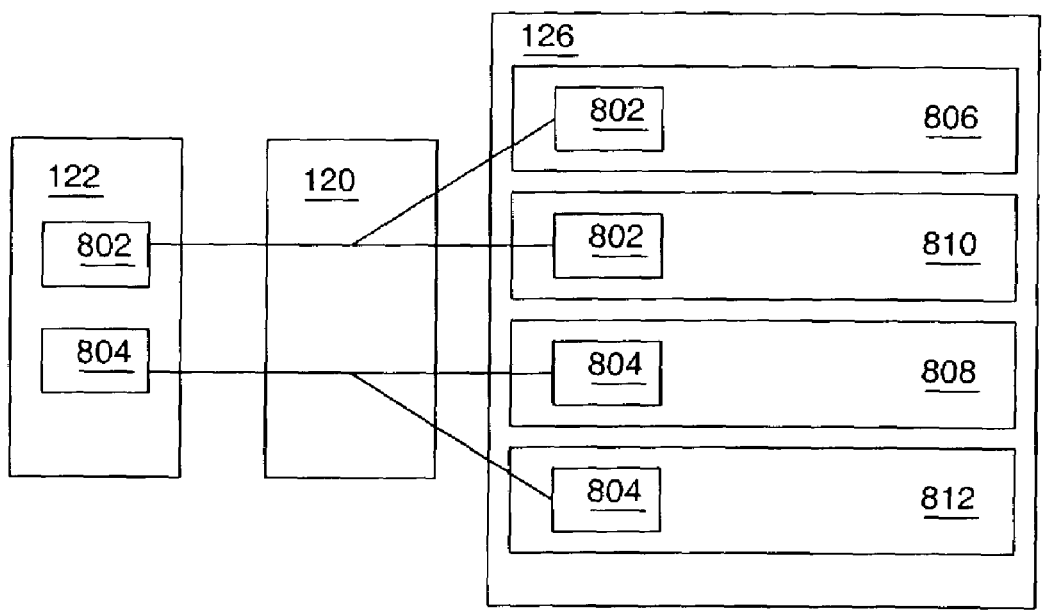
FIG. 8 depicts a block diagram illustrating the localizer program mapping text elements in intermediate file to property codes in the source code, in accordance with methods, systems, and articles of manufacture consistent with the present invention.

Referring to FIG. 8, FIG. 8 depicts a block diagram illustrating localizer program 120 mapping text elements in intermediate file 126 to property codes 802 and 804 in source code 122. A more detailed depiction of step 416 and the functionality of FIG. 8 is described below with reference to FIG. 9. In FIG. 8, the source code contains context information (e.g., Java™ property keys) 802 and 804 that each identify a location of a different text element in the source code. Similarly, the intermediate file contains text elements of a first language 806 and 808 and text elements of a second language 810 and 812 that each contain one of the context information 802 or 804. For each language, the localizer program merges the text element for that language to the correct location in the source code by matching the context information of the text element in the intermediate file with the corresponding context information in the source code. For example, for a first language such as German, the localizer program merges text elements 806 and 810 into the source code around context information 802. Also, for a second language such as English, the localizer program merges text elements 808 and 812 into the source code around context information 804. While this illustrative example depicts two sets of text elements and two context information, one having skill in the art will appreciate that the localizer program can merge a larger number of text elements to a larger number of context information.

Figure 9:
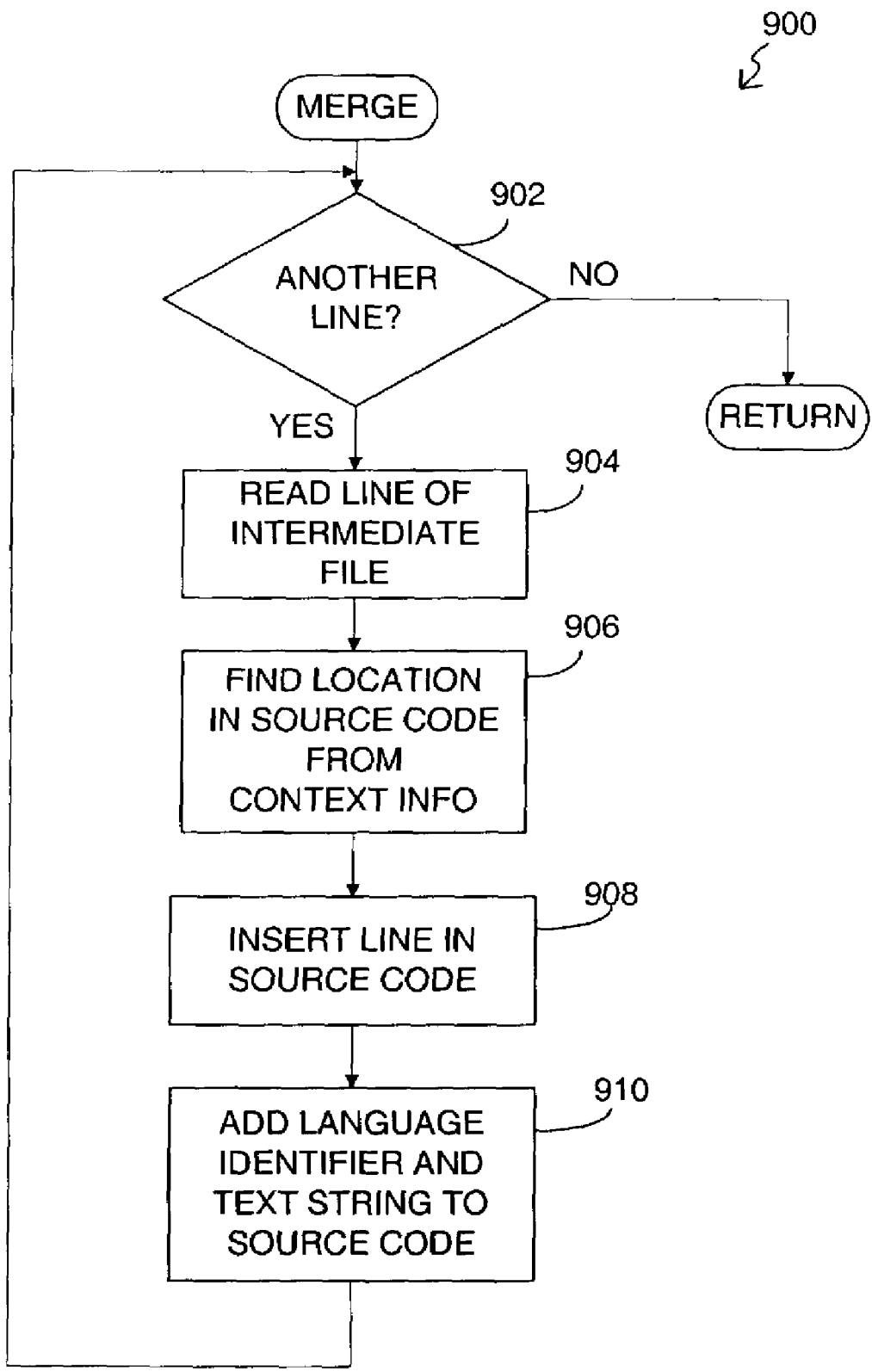
FIG. 9 depicts a flow diagram illustrating in more detail the exemplary steps performed by the localizer program for merging text elements from the intermediate file into the source code, in accordance with methods, systems, and articles of manufacture consistent with the present invention.

Referring to FIG. 9, FIG. 9 depicts a flow diagram 900 illustrating in more detail the exemplary steps performed by the localizer program for merging text elements from the intermediate file into the source code. In FIG. 9, first, the localizer program determines whether there is another line in the intermediate file (step 902). If there is another line in the intermediate file, the localizer program reads that line of the intermediate file (step 904).

As described above, each line of the intermediate file contains entries for the name of the source code file, the context information identifying the location of the text string of the first language in the source code, the language identifier of the text string in that line of the intermediate file, and the text string in that line of the intermediate file. The localizer program determines the location of the text element in the first language within the source code using the source code file name entry and the context information entry from the line of the intermediate file. In other words, the localizer program identifies the relevant source code from the source code file name entry, and the location of the text element in the first language from the context information entry. The localizer program can find the location of the text element in the first language by, for example, searching line-by-line of the source code until the localizer program find code that matches the context information. In the illustrative example, the localizer program identifies the source code file as "viewer.xrb" and the location of the text element in the first language from the context information "com.sun. star.viewer.JavaClient RID_STR_CANCEL".

Then, the localizer program finds the end of the code that relates to the text element in the first language and inserts a blank line in the source code (step 908). The localizer program determines the end of the relevant code, for example, when it reads a start of a context information that relates to another text element.

After inserting the blank line, the localizer program inserts the language identifier of the text element in the second language and the text string in the second language in the blank line of the source code (step 910). Therefore, after step 910, the source code contains context information, followed by a line containing the text string in the first language, and followed by a line containing the text string in the second language. Since the localizer program determines where to insert information into the source code based on context information, instead of by line number, the localizer program can accurately insert the information regardless of whether the source code has been modified.

Then, the localizer program returns to step 902 to determine whether there are additional lines in the intermediate file. Additional lines in the intermediate file contain translations of the text element into additional languages, or translations for additional text elements. In the illustrative example, after the localizer program has merged all the text elements from the intermediate file into the source code, the source code appears as shown below. As depicted, the source code contains code relating to text element "abbrechen" in German and its translations, as well as, code relating to another text element "Passwort" in German and its translations.

```
<?xml version="1.0" encoding="UTF-8"?>
<ResourceBundle package="com.sun.star.viewer">
    <Context name="JavaClient">
        <Key id="RID_STR_CANCEL">
            <Text xml:lang="de">abbrechen</Text>
            <Text xml:lang="x-translate">cancel</Text>
            <Text xml:lang="en_us">cancel</Text>
        </Key>
        <Key id="RID_STR_PASSWORD">
            <Text xml:lang="de">passwort</Text>
            <Text xml:lang="x-translate">password</Text>
            <Text xml:lang="en_us">password</Text>
```

-continued

```
        </Key>
    </Context>
</ResourceBundle>
```

If the localizer program determines in step 902 that there are no additional lines in the intermediate file, then the merge step 416 is complete.

Referring back to FIG. 4, after the localizer program merges the translated text elements into the source code in step 416, the localizer program generates a different temporary single-language versions of the source code for each language (step 418). The temporary single-language versions contain entries for each text element and a corresponding text string in a particular language. For the illustrative example of the source code, the localizer program generates a German temporary single-language version of the source code and an English temporary single-language version of the source code. As will be described below, the compiler program receives these temporary single-language versions as input, and generates executable files in particular languages corresponding to the particular temporary single-language versions of the source code.

Therefore, if the source code is implemented in a particular programming language, the temporary single-language versions correspond to that programming language. In the illustrative example, the source code is implemented in an XML™ format that includes code relating to Java™ technology. Accordingly, in step 418, the localizer program generates temporary single-language versions of the source code that are Java™ property files. A more detailed depiction of step 418 is shown in FIG. 10.

Figure 10:
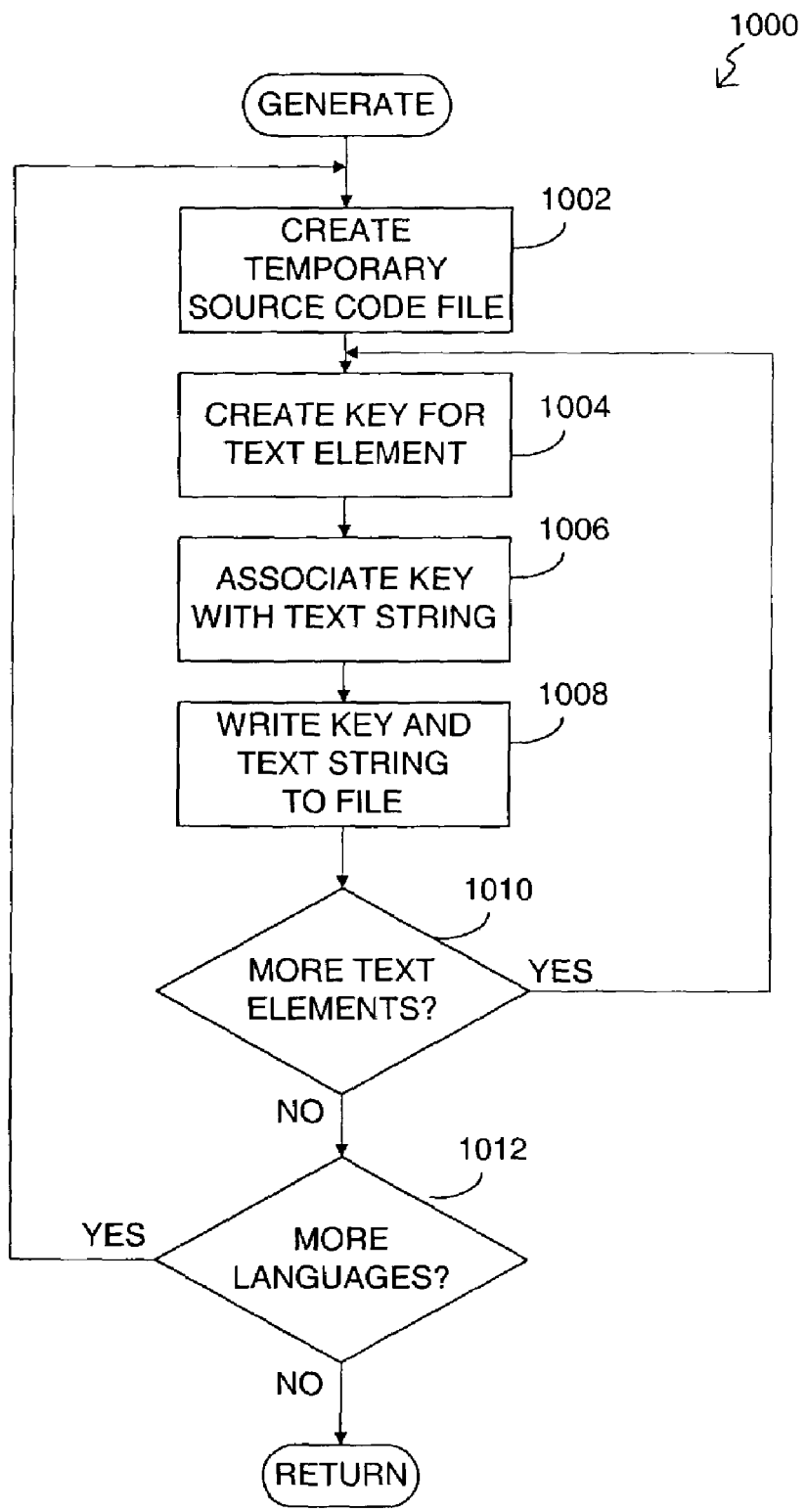
FIG. 10 depicts a flow diagram illustrating the exemplary steps performed by the localizer program for generating temporary single-language versions of the source code, in accordance with methods, systems, and articles of manufacture consistent with the present invention.

Referring to FIG. 10, FIG. 10 depicts a flow diagram 1000 illustrating the exemplary steps performed by the localizer program for generating temporary single-language versions of the source code. In FIG. 10, first, the localizer program creates first temporary single-language version of the source code 130 for the first language (step 1002). Therefore, in the illustrative example, the first temporary single-language version of the source code 130 is for German text elements.

Then, the localizer program creates a text element key for each text element in the source code (step 1004). The text element keys identify the text elements and their respective context information. In the example, the first text element is associated with the context name tag "JavaClient" and the key id "RID_STR_CANCEL". Therefore, the localizer program concatenates these items to form the Java™ property key "JavaClient.RID_STR_CANCEL". One having skill in the art will appreciate that the text element keys can contain additional or alternative information, and may have other formats depending on the programming language used.

After creating the text element key, the localizer program associates the text element key with the text string that is in the language of the temporary single-language version of the source code (step 1006). Referring to the example, the localizer program modifies the Java™ property key to read "JavaClient.RID_STR_CANCEL=abbrechen". Then, the localizer program writes the text element key to the first temporary single-language version of the source code (step 1008).

The localizer program then determines whether there are more text elements in the first language to add to the first temporary single-language version of the source code (step 1010). If the localizer program determines that there are more text elements, the localizer program returns to step 1004. Accordingly, the localizer program will continue to add text element keys to the first temporary single-language version of the source code until there are no more text elements to add.

If the localizer program determines that there are not more text elements, then the localizer program determines whether it should create more temporary single-language versions of the source code for additional languages (step 1012). If there are additional languages, the localizer program returns to step 1002. Otherwise, step 418 of Figure is complete.

In the illustrative example, the localizer program creates two temporary single-language version of the source code: one for the text elements in German text elements and one for the text elements in English. The final temporary German version of the source code is as follows:

JavaClient.RID_STR_CANCEL=abbrechen

JavaClient.RID_STR_PASSWORD=Passwort

The final temporary English version of the source code is as follows:

JavaClient.RID_STR_CANCEL=cancel

JavaClient.RID_STR_PASSWORD=password

As described below, these temporary single-language versions of the source code will be used as input to the compiler program to generate a first executable file that has German text elements and a second executable file that has English text elements.

Referring back to FIG. 4, the illustrative example of the source code is implemented in XML, which supports text elements in multiple languages. It is also possible, however, that the source code is implemented in a format that supports text elements in a single language. This is the case, for example, when the source code is a Java™ property file. If the localizer program determines in step 404 that the source code is a single-language source code, the localizer program creates a text element file that supports multiple languages (step 450). The localizer program does this so that the localizer program can later merge translated text elements into the text element file, since the single-language source code would not support the translated text elements. Therefore, when the text element file is created by the localizer program, it contains enough information from the source code that the localizer program can generate temporary single-language versions of the source code from the text element file. In other words, the multi-language text element file replaces the single-language source code file as "the source code", and the single-language source code file can be deleted if so desired.

To create the text element file, the localizer program reads the lines of source code and identifies text elements, such as text strings and formatting information. The localizer program extracts the text elements, including context information for each text element, from the source code and writes this information into the text element file. The text element file can be in any multi-language format, such as the XML™ file format.

Since the text element file can be an XML™ file, the text element file can be the illustrative example of the multi-language source code file described above. For illustrative purposes, the text element file is the same as the multi-language source code.

One having skill in the art will appreciate, that the text element file is not limited to the illustrative example described herein.

Steps 454-462 of FIG. 4 are similar to steps 410-418, however, instead of the localizer program working with the multi-language source code (as in steps 410-418), the localizer program works with the text element file in steps 454-462. Since the text element file and the multi-language source code are, for illustrative purposes herein, the same, steps 454-462 will be described briefly below and more detailed descriptions can be found above with reference to steps 410-418.

After the localizer program creates the text element file in step 452, the localizer program extracts the text elements from the text element file into the intermediate file (step 454). Since the text element file is the same as the same, for illustrative purposes, as the multi-language source code in the illustrative example, this step is similar to step 410 and FIG. 5, which are described above.

Then, similar to step 412, the localizer program sends the intermediate file to the translator program (step 456). The localizer program then receives the intermediate file back from the translator program (step 458) as in step 414, which is described above.

Once the localizer program has the intermediate file with the translated text elements, the localizer program merges the translated text elements into the text element file (step 460). Step 460 is similar to step 416 and FIG. 8, which are described above.

The localizer program then generates temporary single-language versions of the text element file (a multi-language source code) (step 462). Again, step 462 is similar to 418, which is described above.

Therefore, the localizer program can create temporary single-language versions of source code from either single-language source code files or multi-language source code files. These temporary single-language versions are then used as input by the compiler program to create a different executable file for each language. When a developer wants to modify the source code, the developer modifies the source code and then uses the localizer program to generate the temporary single-language versions of the source code. Therefore, the developer does not have to maintain a different version of the source code for each language and, therefore, does not have to modify each different version.

Further, the illustrative steps of FIG. 4 may be applied in a client-server environment, such as one that uses Java™ technology. For example, a server program could transfer the source code to a client that has the localizer program. The source code includes the text strings in English and context information, such as Java™ property keys that associate the text strings with the source code. The localizer program generates a temporary German version of the source code, which in used by the compiler program to create a German executable version (e.g., an applet).

Figure 11:
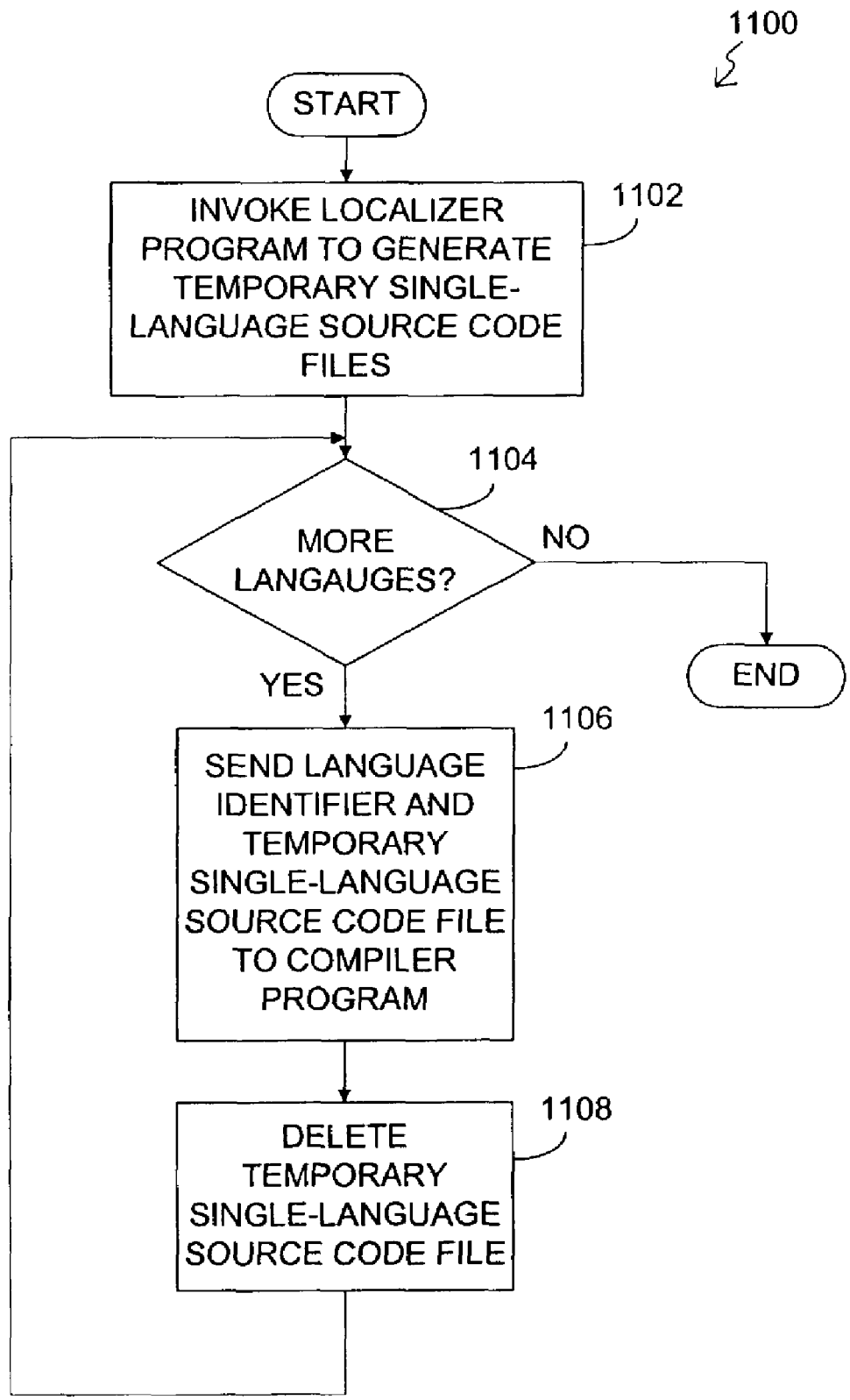
FIG. 11 depicts a flow diagram illustrating the exemplary steps performed by the build program for generating and sending the temporary single-language versions of source code files to the compiler program, in accordance with methods, systems, and articles of manufacture consistent with the present invention.

Referring to FIG. 11, FIG. 11 depicts a flow diagram 1100 illustrating the exemplary steps performed by the build program for generating and sending the temporary single-language versions of source code files to the compiler program. The build program can be, for example, a script file or another type of file that is in accordance with method, systems, and articles of manufacture consistent with the present invention. In summary, the build program initiates execution of the localizer program and, after the temporary single-language version of the source code are generated by the localizer program, sends the temporary single-language versions of the source code to the compiler program. The build program has a language list 150 of the possible languages and, for each language, sends a language identifier and a copy of the relevant temporary single-language version of the source code to the compiler program. In FIG. 11, first, the build program initiates execution of the localizer program to effect generation of the temporary single-language versions of the source code by the localizer program (step 1102). This can be done by, for example, invoking a call. The localizer program's generation of the temporary single-language versions of the source code is described above. One having skill in the art will appreciate that step 1102 is optional for the build program, and that execution of the localizer program can be initiated in another manner, such as by a user command. Then, the build program determines from the language list whether there are additional languages for which to send temporary single-language versions of the source code (step 1104). If the build program determines that there are additional languages, then the build program sends a language identifier for the current language and a copy of the temporary single-language version of the source code for that language to the compiler program (step 1106). The build program can obtain the language identifier from the language list or from another location and can send the information to the compiler program, for example, by invoking a call. For example, if the build program determines from the language list that the current language is English, then the build program reads the language identifier for English from the list and sends the language identifier for English and the temporary English version of the source code to the compiler.

The compiler receives the language identifier and the temporary single-language version of the source code as input from the build program and generates an executable version of the source code in the particular language. As described above, the compiler program can alternatively be an interpreter program.

Then, the build program deletes the temporary single-language version of the source code (step 1108). After the built program deletes the temporary single-language version of the source code, the build program returns to step 1104 to determine whether there are additional languages in the language file. If there are not additional languages in the language file, the build program completes execution.

Therefore, unlike conventional methods and systems that maintain different versions of source code for each desired language, methods, systems, and articles of manufacture consistent with the present invention provide for maintaining a single multi-language source code file from which single-language executable files can be generated. Accordingly, development of the source code is more efficient than conventional methods because the single multi-language source code is modified instead of each single-language version of the source code.

Figure 12:
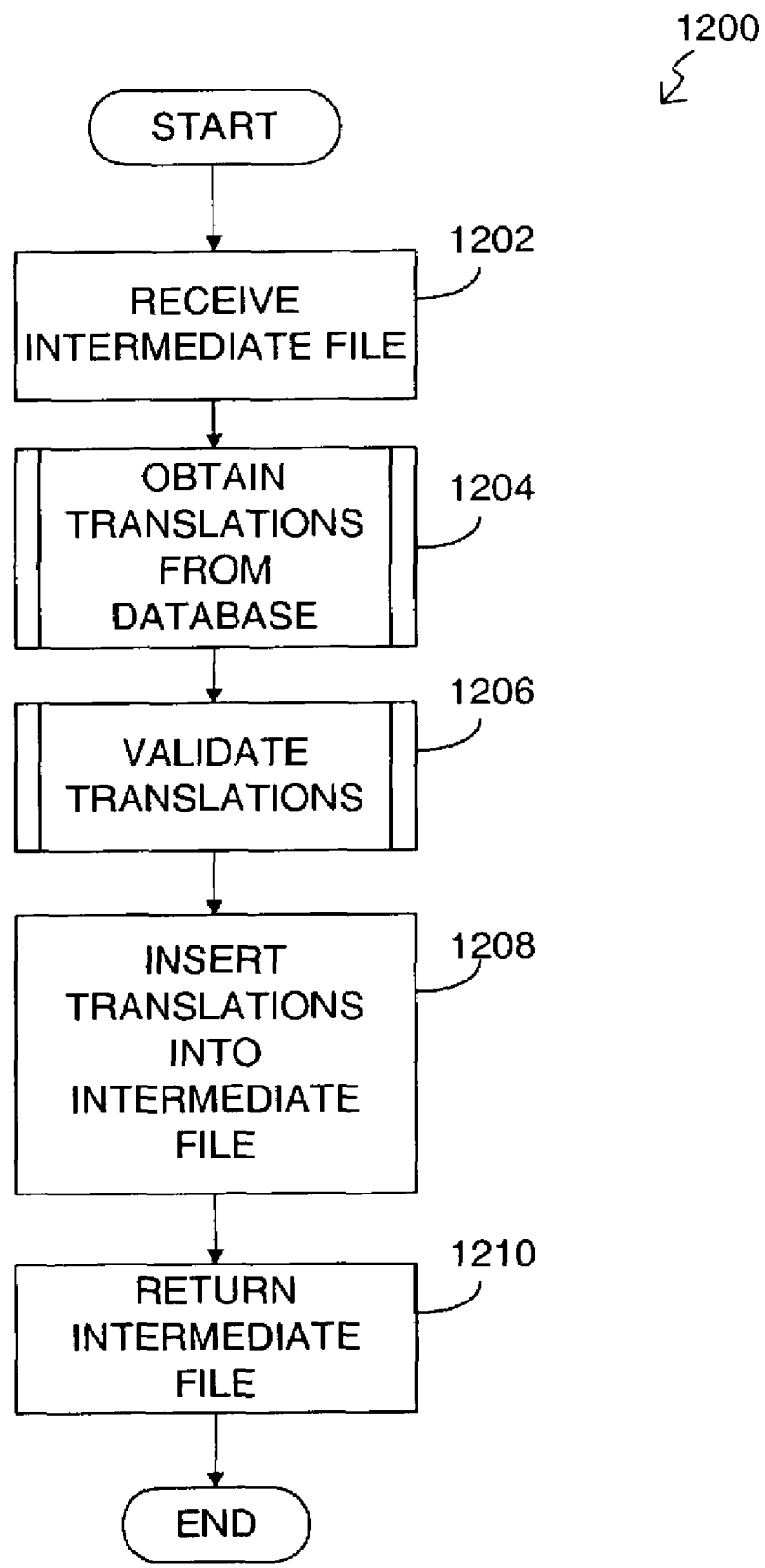
FIG. 12 depicts a flow diagram illustrating the exemplary steps performed by the translator program, in accordance with methods, system, and articles of manufacture consistent with the present invention.

As discussed above with reference to FIG. 4, the localizer program sends the intermediate file to the translator program to translate the text elements. The translator program is a program that is suitable for receiving the intermediate file and translating the text elements that are in the intermediate file. Also, instead of the translation program performing the translation, the translation can be performed manually or semi-manually by a user. In other words, the user can enter translated text elements into the intermediate file or use a program, such as the translator program, with a front-end that allows the user to make selections for the translations. FIG. 12 depicts the illustrative steps performed by an illustrative translator program in accordance with methods, system, and articles of manufacture consistent with the present invention. One having skill in the art will appreciate that the invention is not limited thereto.

Referring to FIG. 12, FIG. 12 depicts a flow diagram 1200 illustrating the exemplary steps performed by the translator program for translating text elements. In FIG. 12, first, the translator program receives the intermediate file from the localizer program (step 1202). The intermediate file identifies to the translator program the language of the text elements in the intermediate file. Further, the intermediate file can identify the target language of the translation, or the target language can be pre-set or received as input from the user. Then, the translator program obtains translations of the text elements in second or additional languages from a database 160 (step 1204). The database is depicted in secondary storage, however, the database can alternatively be located at another location, such as on a remote database server. The database comprises entries 162 for translations of known text elements in various languages. A more detail depiction of step 1204 is shown in FIG. 13.

Figure 13:
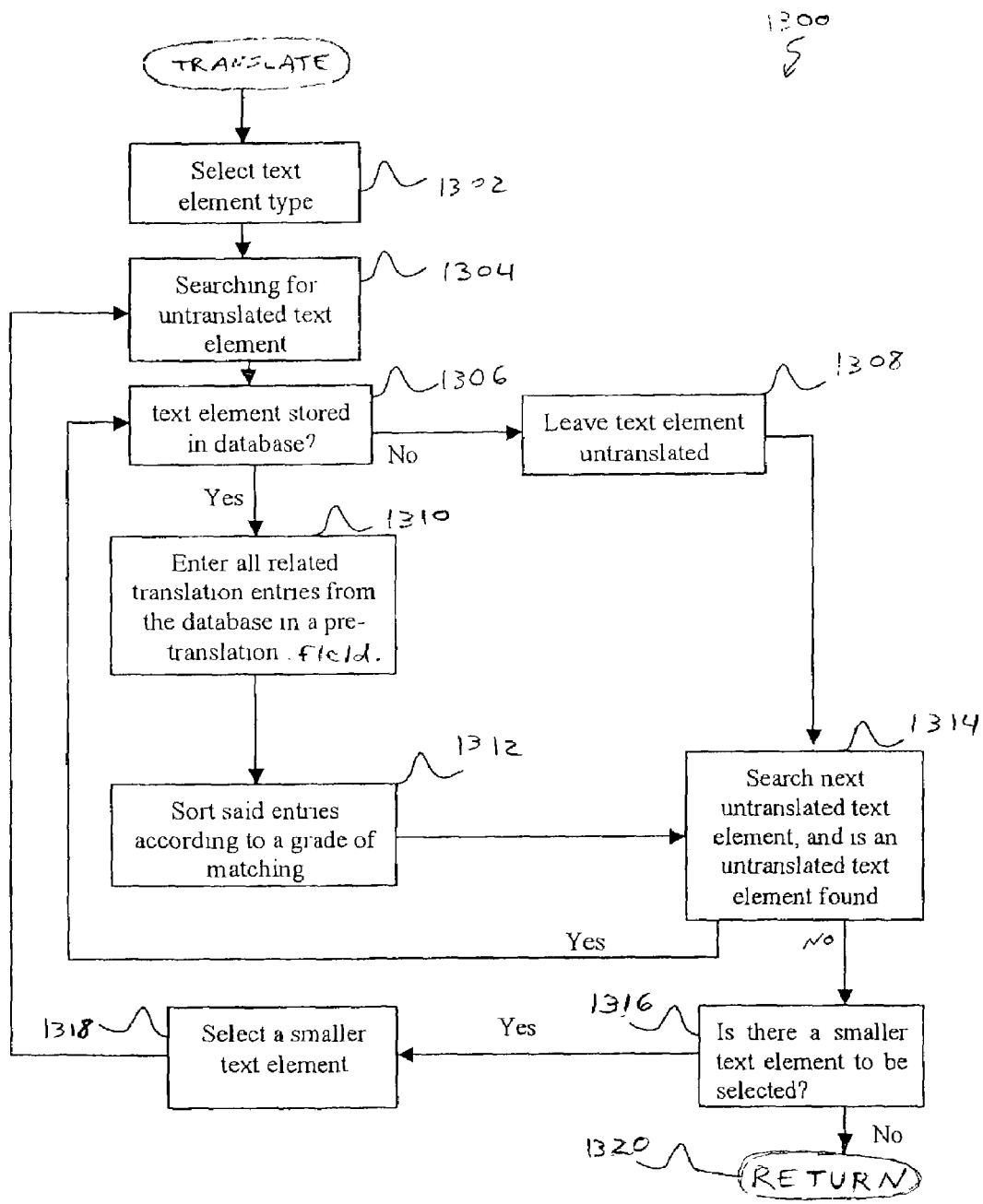
FIG. 13 depicts a flow diagram illustrating the exemplary steps performed by the translator program for obtaining translated text elements from the database, in accordance with methods, system, and articles of manufacture consistent with the present invention.

Referring to FIG. 13, FIG. 13 depicts a flow diagram 1300 illustrating the exemplary steps performed by the translator program for obtaining translated text elements from the database. In FIG. 13, first, the translator program determines or receives input from the user that selects the type of text element which the present source language text (i.e., the text string of the text element) has to be split into (step 1302). The text element can be any language or text unit, such as text sections, sentences, or words. After the translator program splits the source text into individual text elements, the individual text elements are entered in fields of a pretranslation table 164.

Figures 14, 15:
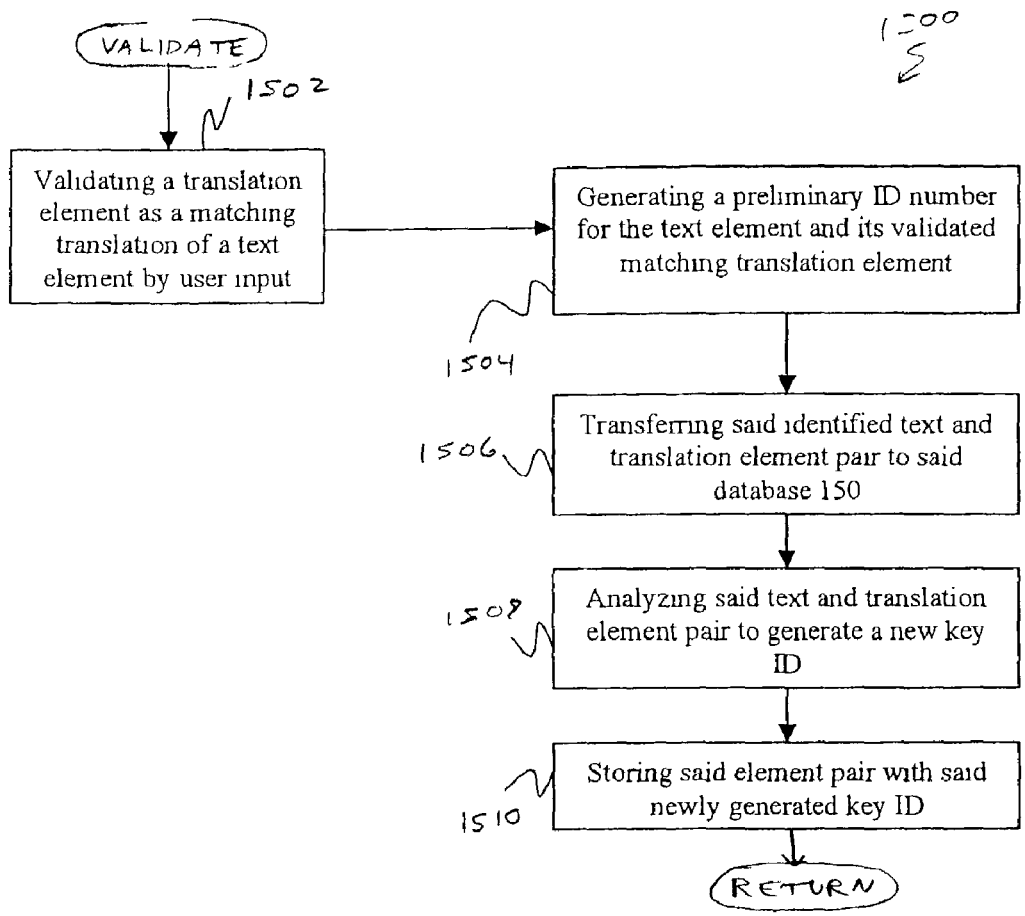
FIG. 14 depicts a block diagram illustrating a section of a pretranslation table suitable for use with methods and systems consistent with the present invention.
FIG. 15 depicts a flow diagram illustrating the exemplary steps performed by the translator program for validating translated text elements, in accordance with methods, system, and articles of manufacture consistent with the present invention.

Referring to FIG. 14, FIG. 14 depicts a block diagram illustrating a section of the pretranslation table suitable for use with methods and systems consistent with the present invention. The depicted table contains four columns. A first column 1402 the table contains a key identification (ID), to identify the entry in the pretranslation table. The key ID can be a single key, or a main ID with attached sub-IDs. A second column 1404 contains language IDs. The language IDs have information about the language used, and are represented by the characterizing numbers of the telephone area code for the particular country. The language IDs can use an alternative convention. The language ID can be a single key, or a main ID with attached sub-IDs, indicating, for example, dialects. A third column 1406 of the table contains text elements (words) in the different languages. When translating with a conventional translation method, it is possible that synonyms lead to equivocal translations. To address this, the table contains a fourth column 1408, providing additional information about how to use the present word. The fourth column contains synonyms or background information of the table entry in the third column.

The different keyword may comprise additional columns with additional ID numbers. Different columns can, for example, contain the sorting index in the language of the word, for sorting the text element entries according to different sorting rules, like alphabetic, number of characters, or grammar information. To simplify this, additional columns can contain information related, for example, to the software number, to enable the-users of the system to distinguish if a translation is validated for the present software localization or has been validated for another software localization.

The table may further comprise columns that relate the present entry to other languages, so that one table with (n−1) additional columns is used for each language, to provide translations between all n languages. Instead of n·(n−1) tables to connect each language with the others, another possible table structure with single tables for each language and a central (e.g., n-dimensional) relation matrix (or tensor) enables the use of transitive translations. So if a text element has not been translated from a first language to a third language, the translator program may detect that the text element has been already validated in a translation to a second language, and has been validated in a translation from said second language to the third language. Therefore, the translator program is able to derive a translation proposal via the second language.

The database can also be an object oriented database. Further, the pretranslation table can further comprise information about the origin of the text or the translation when the translator program supports translation specific keyword databases.

Referring back to FIG. 13, after selecting the text element types in step 1302, the translator program retrieves the next untranslated source text element (step 1304). Then, the translator program searches the database for a matching source text element in the database (step 1306). If the translator program determines in step 1306 that the source text element is not stored in the database, then the translator program leaves the text element untranslated (step 1308). Also, the translator program leaves a pretranslation field in the pretranslation table empty or marks the field with an "untranslatable" mark.

If the translator program determines in step 1306 that the source text element exists in the database, then the translator program copies the related translation from the database to the pretranslation field in the pretranslation table (step 1310). The text elements stored in the database can be exact matches or fuzzy matches. For purposes of this disclosure, an "exact match" means that the source text element and the database text element are identical. A "fuzzy match" means that the source text element and the database text element differ in one or a few words or punctuation marks. The translator program can mark fuzzy matches with an index indicating the fuzziness of the match, that is the quality of the match. In both cases, the related translations are copied to the pretranslation field of the pretranslation table.

In the case of fuzzy matches or in the case of more than one exact match, the translator program sorts pretranslation field entries (e.g., for their matching quality) to prevent a user from wasting time searching for a certain match (step 1312). More than one translation of a single entry can be possible, as translations of single words can be equivocal and so the translation of whole sentences can also be equivocal.

Then, the translator program searches for the next untranslated source text element (step 1314). If the translator program determines that there is a next untranslated source text element in step 1314, then the translator program returns to step 1306. However, if the translator program determines in step 1314 that there is not another untranslated source text element, then the translator program determines whether the translated text element is the smallest text element available (step 1316). If the translated text element is not the smallest available, the translator program selects a smaller text element (step 1318). Then the translator program returns to step 1304 to step through steps 1304 to 1316, until no next smaller text element can be found. If the translator program cannot find a smaller text element in step 1316, then the translation in completed (step 1320).

Referring back to FIG. 12, after the translator program obtains the translation of the text element from the database, step 1204 is repeated until all text elements have been translated. At this point, the translator program can receive user input to edit the received translated text element. Then, the translator program validates the translations (step 1206). A more detailed depiction of step 1206 is described below with reference to FIG. 15.

Referring to FIG. 15, FIG. 15 depicts a flow diagram 1500 illustrating the exemplary steps performed by the translator program for validating translated text elements. During the validation, the translator program prompts the user to decide whether the user wants to accept (i.e., validate) or discard a suggested translation. The translator program can automatically validate a translation if the user has already validated the same translated text element. In FIG. 15, first, the translator program prompts the user to validate the translated text element and receives user input in response to the prompt (step 1502). Illustrative examples of the functionality of step 1502 are described below with reference to FIGS. 16-19.

Referring to FIG. 16, FIG. 16 depicts a block diagram of three illustrative user interaction interfaces (e.g., screenshots) that are displayed on the video display by the translator program during validation. A first screenshot 40 shows all found matches by the translator program down to a matching of 84%. Screenshot 40 comprises four columns. A first column 1602 represents a key ID of the text element (e.g., a sentence) in the text. A second column 1604 represents the language ID of the text element entry. A third column 1606 represents the corresponding database text elements entries. To simplify the user's decision of which of the entries most match the source text element, all entries in the language column have a value of "1". A fourth column 1608 can represent two kinds of information. In the case of a source text element, the fourth column represents a status. The status of the source text element in the first line and third column of screenshot 40 is "untranslated". In the case of pretranslation entries (line 2 to 5), the fourth column represents a "Quality" value, indicating how exact the source language entry (line 2 to 5) in the table matches the source text element (in line 1). The depicted percentage values may be determined, for example, according to the formula:

$$x = \frac{b_{common}}{a_{ste}} \cdot 100,$$

wherein $a_{ste}$ represents the number of characters of the source text element and $b_{common}$ represents the number characters common and common in sequence to the source text element and the source language database entry.

To simplify the use of the method the differing characters are depicted bold, italic and are surrounded with a box. Other markings can also be applied. In screenshot 40, the field in the third column, second line is surrounded by a bold line to indicate that this translation suggestion is marked. With a user input, the user may select the surrounded translation suggestion, e.g., by a mouseclick, a keystroke, or a contact with a touch screen.

With the user selection, the translator program changes the displayed table to screenshot 42: all unselected translations suggestions are deleted from the screen, and the third line of the table contains the translation of the database entry. Therefore, line 3, column 1 contains the same key ID as the other two lines, and line 3, column 2 contains the language ID of the target language. Line 3, column 3 contains the translation of the source language database entry, and column 4 indicates an exact match of the source text element and the source language database entry. The translation suggestion is marked by the translator program with a bold frame to indicate that the translation suggestion is selected.

Upon receiving a second user input, the translator program changes the depicted table to screenshot 44. Screenshot 44 contains one line: In the first field, the key ID of the source text element; in the second field, the language ID; in the third field, the translated text element; and in the fourth field, the status indicating "fully translated".

One having skill in the art will appreciate that the screenshots depicted herein are illustrative, and the invention is not limited thereto. For example, the first two columns of the screenshots 40, 42, 44 may be economized. The makings may be different. Further, the translator program may skip screenshot 42, if the quality of the selected suggestion is 100%.

Figure 17:
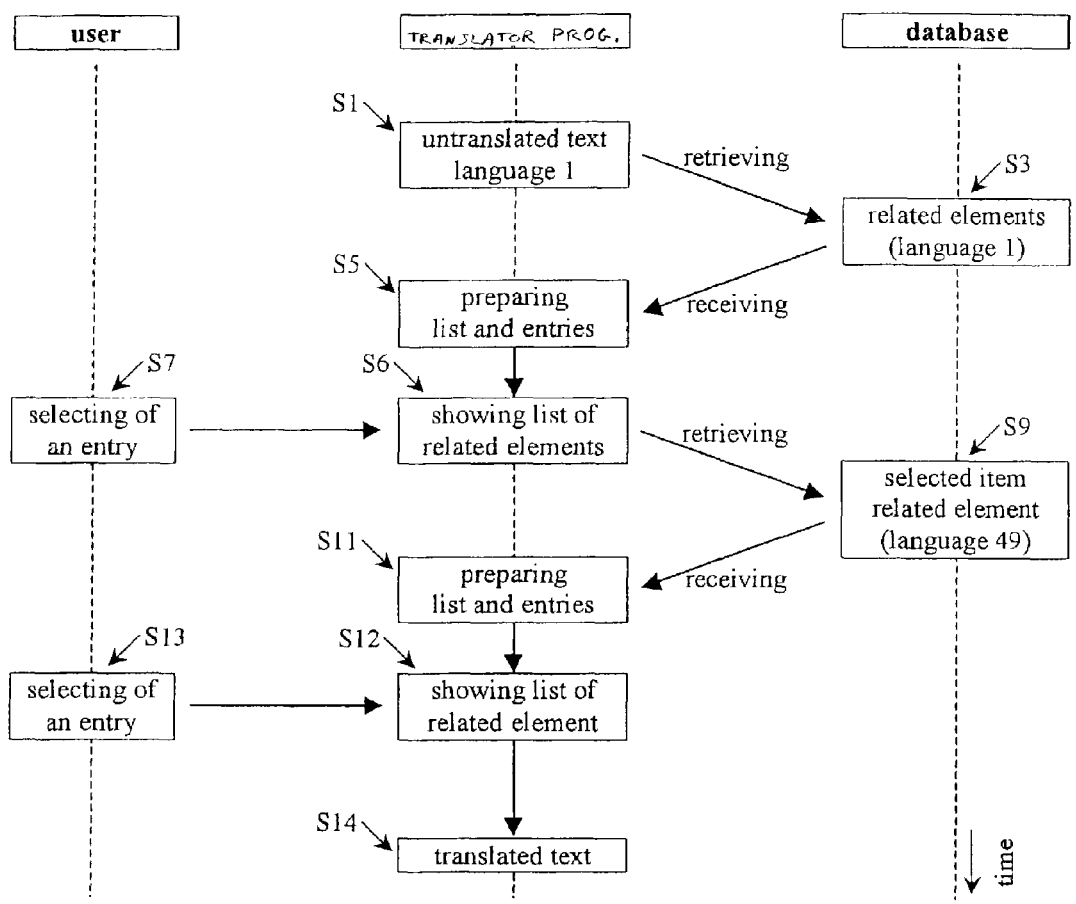
FIG. 17 depicts a block diagram schematically illustrating the steps performed by the localizer program so that a user can validate the text elements depicted in FIG. 16.

Referring to FIG. 17, FIG. 17 depicts a block diagram schematically illustrating the steps performed by the localizer program so that a user can validate the text elements depicted in FIG. 16. The untranslated text is the same as shown in FIG. 16 and references to FIG. 16 will be made in order to describe FIG. 17. In an operation S1, the localizer program processes an untranslated text. The text is, for example, "The computer is standing on the table". The untranslated text is also, for example, a text according to language "1".

In an operation S3, the translator program accesses the database to retrieve translation text elements for the untranslated text element of the same language, where all related translation text elements are of the language "1". As described above, the translator program may produce matches that results in either exact matches or in fuzzy matches.

In an operation S5, the translator program receives the retrieved related text elements from the database. The matching quality value according to the formula $$x = \frac{b_{common}}{a_{ste}}.$$

is determined of the received related translation elements by the translator program.

In an operation S6, the translator program sequences the translation related elements in a list as shown in list 40 depicted in FIG. 16. All retrieved entries are listed according to their matching quality.

In an operation S7, the user selects an entry of list 40 shown in FIG. 16. Since the second list entry may have assigned a quality of 100%, the untranslated text and the translation related element match exactly. Due to the matching quality, the user may select the second entry of the list, indicated by the bold surrounding lines according to the depicted list 40 in FIG. 16.

In an operation S9, the translator program retrieves the translation of the translation related element selected in operation S7 from the database. To do this, the translator program may use the respective key-ID of the selected translation related element. In the illustrative example, the retrieved item is in the language "49".

In an operation S11, the translator program receives the translation of the selected translation related element in language "49" from the database. Then, the translator program prepares and displays a list with entries for the untranslated text, the selected translation related element, and the translation to the user desired language. The translator then determines the matching quality, in operation S5, so a new determination may be skipped by the user if desired. The matching quality value of the translation related element may be assigned to the corresponding retrieved translation, since the determination of the matching quality may be determined in combination with text of the same language.

In an operation S12, the translator program shows the list comprising the key-ID, the language code, the corresponding element and the status or quality. The list corresponds to list 42 in FIG. 16.

In an operation S13, the user confirms the translation of the untranslated text by selecting the translation. The selection may be indicated by bold surrounding lines, as shown in list 42 in FIG. 16.

Since the matching quality of the untranslated text and the translation related element retrieved from the database shows a value of 100%, the translation is an exact translation. The respective entry is available in the database such that no additional entry may have to be added to the translation database.

In an operation S14, the translation of the untranslated text has been done successfully and is finished. The translator program can then present the next untranslated text for translating, and return to operation S 1.

Figure 19:
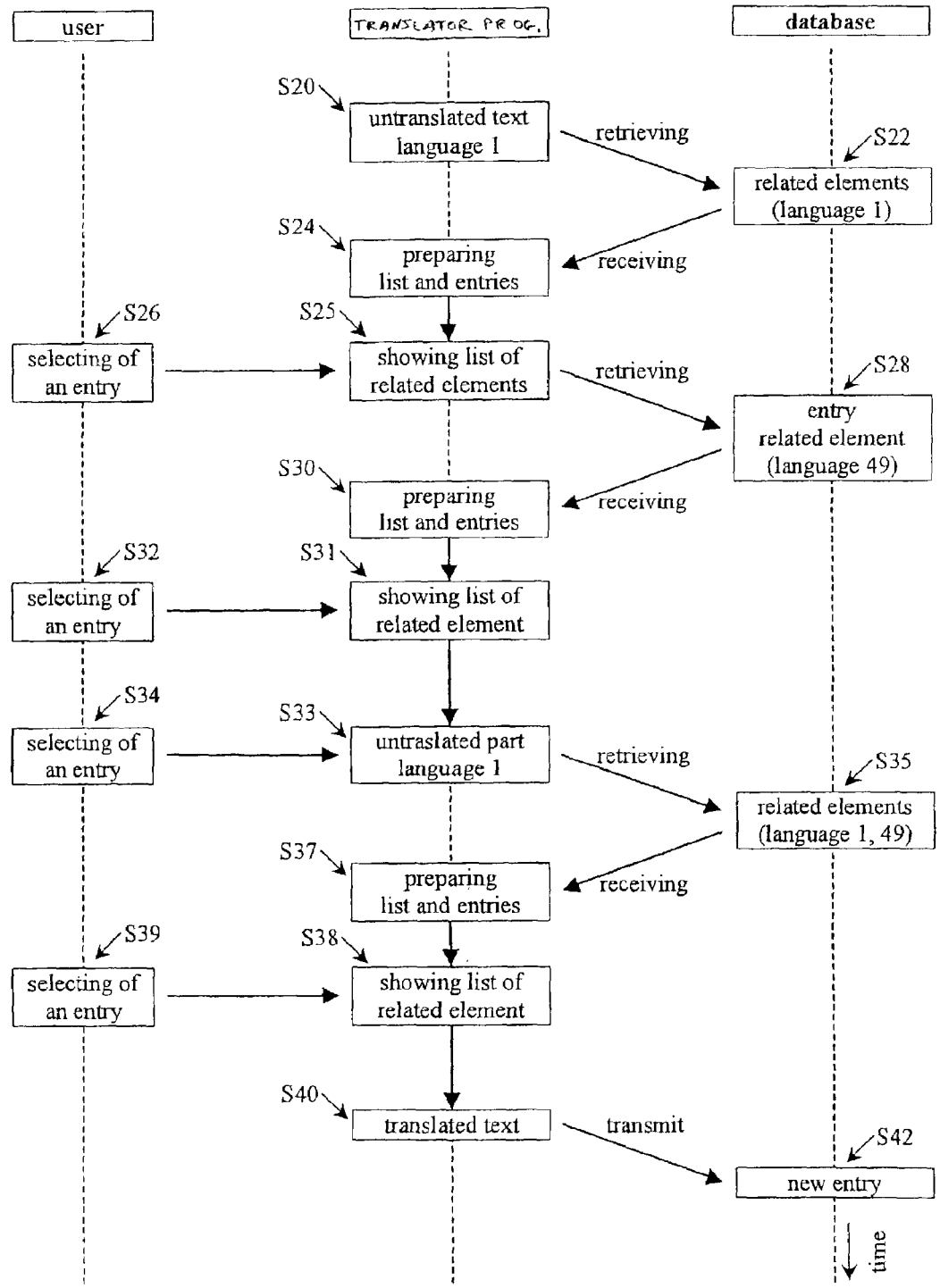
FIG. 19 depicts a block diagram schematically illustrating the steps performed by the localizer program so that a user can validate the text elements depicted in FIG. 18.

The example depicted in FIGS. 16 and 17 relate to a 100% matching translation. In other words, the exact translation of the untranslated text was found in the database. Therefore, the translator program does not have to include additional database entries in the database. The following FIGS. 18 and 19 depict an example of a non-exactly matching untranslated text involving the generation of a new database entry.

Referring to FIG. 18, FIG. 18 depicts another set of user interaction interfaces (i.e., screenshots). A first screenshot 50 shows a screenshot depicting all found matches in a matching range of 66% down to 61%. Screenshot 50 comprises four columns. Similar to FIG. 16, a first column 1802 represents a key ID of the text element (sentence) in the text. A second column 1804 represents the language of the text element entry. A third column 1806 represents the source text element and database text elements entries. To simplify the decision of which of the pretranslation table entries most match the source text element, the pre-translation entries are shown in the source language, and therefore all entries in the language column are "1". A fourth column 1808 represents two kinds of information. In the case of a source text element, the fourth column represents a status. The status of the source text element in screenshot 50 is "untranslated". In the case of pretranslation entries (line 2 to 3), the fourth column represents a "Quality" value, indicating how exact the source language entry in the pretranslation table matches the source text element.

The depicted percentage values are determined according to the same formula as in FIG. 16. The formula used in FIG. 16 may be modified by replacing $a_{ste}$ by $a_{dte}$ representing the number of characters of the database text element. One having skill in the art will appreciate that the formula is not limited to the use of characters, but can be applied, for example, to words, sentences, or other items. The formula may also comprise other terms using grammar structure related values to characterize the matching. Unlike FIG. 16, the illustrative retrieved translation suggestions reaches a maximum match of 66%. The closest source text entry in the table is marked with a bold frame.

Screenshot 52 depicts a user input by the bold frame. Screenshot 52 shows in the first line, the source text element; in the second line, the retrieved database text entry; and in the third line, the translation of the database entry. As the translator program can detect and mark the differences between the source text element and the database entry, the translator program can mark the differences in the translation of the database entry. All marked elements are depicted bold, italic, and with a small frame in the figure.

Next, the user may edit the translation entry in the pretranslation table, for example, using keyboard input, a mouse click, or a voice command. As shown in the present pretranslation table, the user accepted the proposed translation by a user input.

By accepting the proposed translation that has a matching value of 66%, the translator program translates the matching part of the source text element and not the remainder. Screenshot 54 represents a partially translated element in the pretranslation table. Screenshot 54 may further depict the source text element and the retrieved database entry translation. In the first column, the table depicts the key ID "1" of the source text element. In the second column, the table depicts no entry. The entry in the second column can be "1", or "1-49" as part of the text element still is untranslated. In the third column, the partially translated text is depicted, with a bold, italic underlined untranslated part depicted in capitals. The untranslated sentence is surrounded by a dotted bold frame to indicate that the present state of the sentence requires additional processing.

To reach the next operation, the user may select another text element size to post-process the entry in the preprocessing table, or the user may first translate all other text elements and then proceed with a smaller text element.

Screenshot 56 depicts a second translation stage with smaller text elements. In this stage, the text elements are words or word/article combinations. The table depicts, in the first column, a newly generated key ID 127 to distinguish the different stages of the translation algorithm. In the second column, first line, the language ID has not been changed, as the sentence is still partially translated. In the second line, the retrieved database entry is marked with a "1". And in the third line, the translation suggestion is marked as the target language with a "49". In the third column, the untranslated part is of the sentence is marked as in screenshot 54, depicting its related database entry and its translation suggestion retrieved from a translation database.

With a user input accepting the proposed translation, the depicted screenshot changes to screenshot 58, which contains one line: in the first field, the key ID of the source text element (in this case the sentence); in the second field, the language ID "49"; in the third field, the translated text element; and in the fourth field, the status indicating "fully translated".

With the operation of accepting the suggested translation proposal, the translator program generates a new database entry 60 containing the source text element and the accepted translation. To enable retrieval of the pair, the entries comprise key IDs and language IDs. The new database entry is not depicted, as the storage operation can be performed automatically.

Further, the translation database may comprise different 100% matching database entries, due to different equivocal translations.

FIG. 19 depicts a block diagram schematically illustrating the steps performed by the localizer program so that a user can validate the text elements depicted in FIG. 18. In FIG. 19, the untranslated text is the same as shown in FIG. 18 and references to FIG. 18 will be made in order to describe FIG. 19. In an operation S20, the translator program processes an untranslated text. The text is, for example, "The computer is standing on the table". The untranslated text may be further be in language "1".

In an operation S22, the translator program accesses the database for retrieving translation elements for the untranslated text of the same language, wherein all related translation elements are in language "1". To perform this step, the translator program may use a matching operating that may result in exact matches or fuzzy matches.

In an operation S24, the translator program receives the retrieved related elements. The matching quality value according to the formula $$x = \frac{b_{common}}{a_{die}}.$$

100 is determined of the received related translation elements by the translator program.

In an operation S25, the translator program prepares a list with the untranslated text and the translation related elements, as shown in screenshot 50 depicted in FIG. 18. All retrieved entries are listed according to their matching quality. The list may present the key-ID, the language the untranslated text or the translation related elements, respectively, and the matching quality. The non-fitting text parts of the translation related elements in relation to the untranslated text may be indicated by italic characters. In an operation S26, the user selects an entry of the presented screenshot 50. In this example, no entry of the list shows a matching quality of 100%, indicating that no exact match was retrieved from the database. The second entry of screenshot has a matching quality value of 66%. The user may select the best matching entry, which is the second entry, which may be indicated by bold surrounding lines.

In an operation S28, the translator program retrieves the translation of the translation related element selected in operation S26 from the database. To do so, the translator program may use the respective key-ID of the selected translation related element. The retrieved translation is a translation of the selected translation related element in the language "49".

In an operation S30, the translator program receives the translation in language "49" of the selected translation related element from the database. The translator program then prepares a list presenting the untranslated text, the selected translation related element, and the translation to the user desired language. Then, the translator program determines the matching quality, in operation S24, so that the user may skip a new determination if desired. The translator program assigns the matching quality value of the translation related element to the corresponding retrieved translation, since the determination of the above defined matching quality may be determined only in combination with text of the same language.

In an operation S31, the respective list comprising the key-ID, the language code, the corresponding element and the status or quality, respectively, are presented by the translator program in a list, as illustrated in screenshot 52. The non-fitting text parts of the translation related elements in relation to the untranslated text are indicated by italic characters.

In an operation S32, the user confirms the translation of the untranslated text by selecting the translation. The selection is indicated by bold surrounding lines, as shown in screenshot 52.

In an operation S33, since no exact matching translation related element was found in the database, the translator program presents a mixed language translation result to the user. This is depicted in screenshot 54. As shown, the text "The computer" may have not been translated, but the remaining part of the sentence may have been translated by the above performed operations.

In an operation S34, the user selects the untranslated text part for further translation, as shown in screenshot 54.

Further, the translator program can continued by trying to translate a not translated text part, defining this part as a untranslated text and performing translation operations according to the operation described above. The untranslated text "The computer" of the language "1" may be processed beginning at an operation 35.

In operation S35, the translator program retrieves a translation related element according to the untranslated text part from the database. The retrieving may involve a matching operating wherein the matching operation results in exact matches or fuzzy matches. The translation related elements in language "1" that correspond to the untranslated text part are searched.

The retrieving of translation related elements with respect to the untranslated text part may return a single matching translation related element. In this case, the translator program may also automatically retrieve the translation in language "49", since no further translation related elements may be presented to the user for selecting.

In an operation S37, after retrieving of the translation related element and the translation into the language "49", the translator program prepares a list of the partially translated text, the translation related element according to the untranslated text part, and the translation. The translator program also determines the matching quality value. The determining of the quality may be derived in respect to the untranslated text part and the retrieved translation related element. The translation may be assigned the same matching quality value.

To indicate the new translation operation with respect to the untranslated text part, the translator program assigns new key-ID to the list entries. As shown in screenshot 56 depicted in FIG. 18, the key-ID is "127".

In an operation S38, the translator program displays the list of the partially untranslated text, the retrieved translation related element, and the translation (language "49") to the user. The respective list can be seen in screenshot 56 depicted in FIG. 18. As depicted, the partially translated text is assigned no language ID. A status information of the partially translated text indicates a percentage value according to the translated text part.

In an operation S39, the user selects the second list entry of the screenshot 56 depicted in FIG. 18. The selection is indicated by bold surrounding lines.

In an operation S40, the combination of the two independent translation operations of the untranslated text of operation S20 leads to the complete translation thereof. The complete translation is presented by the translator program to the user. The key-ID of the translation shows the former key-ID value of operation S31. The status information indicates the successful translation. The respective list is shown in screenshot 58, which is depicted in FIG. 18.

In an operation S42, since the untranslated text was not found in the database, the translator program generates a new database entry. The contents of the new database entry is shown in screenshot 60 of FIG. 18. The key-ID is given by an available key-ID of the database, and may be generated automatically as a result of the generation of the database entry. The translator program then presents the next untranslated text for translating to the user, and may return to operation S20.

The adding of new database entries provides that untranslated text is translated in the same manner to the respective translation language, thereby preventing the usage of synonyms or synonym text constructions that may irritate and confuse a reader of the translated text.

Referring back to FIG. 15, after the user validates the translation in step 1502, the translator program generates a preliminary key identification number (key ID) for the translation (step 1504). Then, the translator program transfers the text element and translated text element to the database (step 1506). After transferring the pair of elements, the translator program generates a new key ID for the pair (step 1508). Then, the translator program stores the text element and the translated text element in the database (step 1510). With a new entry stored in the database, the translation database grows and enables the database to increase the grade of matching of retrieved translation elements.

The preliminary key ID may be cancelled or economized, if the database itself can generate a key ID. Also, the operations of updating the database may comprise the updating of, for example, statistical information. Further, the database may be informed about the number indicating how often a known translation element has been used to translate a certain text element.

The single text elements can be stored in any logical form in the database. For example, a text may be present as a tuple of key identification numbers of sentences, or the texts and sentences may be present as a tuple of key identification numbers of words or grammar reference. The text, words, or sentences may be present as single texts in the database.

Further, the data in the database can be retrieved using a database management system (DBMS). Therefore, the database can use relational algorithms between tables. The DBMS can store the text elements, for example in a directory table, and the translation elements in a related user specific translation table. Therefore, the data source of the DBMS may utilize relational algebra to interconnect said text elements with said translation elements. The DBMS user interface enables the user to translate text elements by accessing pre-translation tables. The translation elements can be selected and validated in each field of the pre-translation table by a user input. The user input can be a keyboard input, a mouse input, or another type of input. The validated text elements and validated translation elements are stored in the database, and can be automatically retrieved if the user accesses the database with a DBMS to retrieve said text element another time.

Referring back to FIG. 12, after the validation has been completed in step 1206, the translator program inserts the translated text elements into the intermediate file (step 1208). Then, the translator program returns the intermediate file containing the translated text elements to the localizer program.

Thus, unlike conventional methods and systems that maintain different versions of source code for each desired language, methods, systems, and articles of manufacture consistent with the present invention provide for maintaining a single multi-language source code file from which single-language executable files can be generated. Accordingly, development of the source code is more efficient than conventional methods because the single multi-language source code is modified instead of each single-language version of the source code.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-objectoriented programming systems. The scope of the invention is defined by the claims and their equivalents.

What is claimed:

1. A method in a data processing system having a program and a source code including a text element in a first natural language, the method comprising the steps performed by the program of:

extracting the text element in the first natural language from the source code, the extracted text element including context information that identifies a location of the text element in the first natural language in the source code;

obtaining a translation of the extracted text element in a second natural language;

merging the translation of the text element in the second natural language into the source code at a merge location based on the context information such that the source code includes the text element and the translation of the text element; and after merging the translation of the text element into the source code, generating a single-natural-language version of the source code in the first natural language and a single-natural-language version of the source code in the second natural language.

2. The method of claim 1, further comprising the steps of: accessing an initial source code that is a single-language source code; and creating the source code from the initial source code, the source code being a multi-language source code.

3. The method of claim 2, wherein the initial source code is a JAVA property file.

4. The method of claim 1, wherein the source code is implemented in extensible markup language.

5. The method of claim 1, wherein the text element in the first natural language is extracted to a first file.

6. The method of claim 1, wherein the step of obtaining the translation of the extracted text element in the second natural language comprises the steps of:

sending the text element in the first natural language to a translation program; and receiving the translation of the text element in the second natural language from the translation program.

7. The method of claim 1, wherein the context information identifies a name of the source code.

8. The method of claim 1, wherein the text element in the first natural language includes an identifier of the first natural language.

9. The method of claim 1, wherein the text element in the first natural language includes a text string in the first language.

10. The method of claim 1, wherein the text element in the first natural language includes formatting information.

11. The method of claim 1, wherein the text element in the first natural language includes layout information.

12. The method of claim 1, wherein the text element in the first natural language includes a language dependent code section of the source code.

13. The method of claim 1, wherein the step of merging the translation of the text element in the second natural language into the source code comprises the step of:

inserting the translation of the text element in the second natural language into the source code.

14. The method of claim 1, wherein the step of generating the single-natural-language version of the source code in the first natural language and the single-natural-language version of the source code in the second natural language comprises the steps of:

generating a temporary version of the source code in the first natural language that includes the text element in the first natural language; and generating a temporary version of the source code in the second natural language that includes the translation of the text element in the second natural language.

15. The method of claim 1, wherein the source code is implemented using JAVA technology.

16. The method of claim 1, wherein the context information includes JAVA property keys.

17. A method in a data processing system having a program and a JAVA property file including a text element in English, the method comprising the steps performed by the program of:

creating an extensible markup language file;

extracting the text element in English from the JAVA source code, the extracted text element including a context information that identifies a location of the text element in the English in the JAVA property file;

writing the text element in English into the extensible markup language file;

sending the text element in English to a translation program;

receiving a translation of the text element in a different natural language from the translation program;

merging the translation of the text element in the different natural language into the extensible markup language file at a merge location based on the context information such that the extensible markup language file includes the text element and the translation of the text element; and after merging the translation of the text element into the extensible markup language file, generating a temporary JAVA property file in English that includes the text element in English, but not the text element in the different natural language, and generating a temporary JAVA property file in the different natural language that includes the translation of the text element in the different natural language, but not the text element in English, to effect an executable version of the extensible markup language file in English and an executable version of the extensible markup language file in the different natural language.

18. A computer-readable storage medium containing instructions that cause a program, in a data processing system having a source code, to perform a method comprising the steps of:

extracting a text element in a first natural language from the source code, the extracted text element including context information that identifies a location of the text element in the first natural language in the source code;

obtaining a translation of the extracted text element in a second natural language;

merging the translation of the text element in the second natural language into the source code at a merge location based on the context information such that the source code includes the text element and the translation of the text element; and after merging the translation of the text element into the source code, generating a single-natural-language version of the source code in the first natural language and a single-natural- language version of the source code in the second natural language.

19. The computer-readable storage medium of claim 18, further comprising the steps of:

accessing an initial source code that is a single-language source code; and creating the source code from the initial source code, the source code being a multi-language source code.

20. The computer-readable storage medium of claim 19, wherein the initial source code is a JAVA property file.

21. The computer-readable storage medium of claim 18, wherein the source code is implemented in extensible markup language.

22. The computer-readable storage medium of claim 18, wherein the text element in the first natural language is extracted to a first file.

23. The computer-readable storage medium of claim 18, wherein the step of obtaining the translation of the extracted text element in the second natural language comprises the steps of:

sending the text element in the first natural language to a translation program; and receiving the translation of the text element in the second natural language from the translation program.

24. The computer-readable storage medium of claim 18, wherein the context information identifies a name of the source code.

25. The computer-readable storage medium of claim 18, wherein the text element in the first natural language includes an identifier of the first natural language.

26. The computer-readable storage medium of claim 18, wherein the text element in the first natural language includes a text string in the first natural language.

27. The computer-readable storage medium of claim 18, wherein the text element in the first natural language includes formatting information.

28. The computer-readable storage medium of claim 18, wherein the text element in the first natural language includes layout information.

29. The computer-readable storage medium of claim 18, wherein the text element in the first natural language includes a language dependent code section of the source code.

30. The computer-readable storage medium of claim 18, wherein the step of merging the translation of the text element in the second natural language into the source code comprises the step of: inserting the translation of the text element in the second natural language into the source code.

31. The computer-readable storage medium of claim 18, wherein the step of generating the single-natural-language version of the source code in the first natural language and the single-natural-language version of the source code in the second natural language comprises the steps of:

generating a temporary version of the source code in the first natural language that includes the text element in the first natural language; and generating a temporary version of the source code in the second natural language that includes the translation of the text element in the second natural language.

32. The computer-readable storage medium of claim 18, wherein the source code is implemented using JAVA technology.

33. The computer-readable storage medium of claim 18, wherein the context information includes JAVA property keys.

34. A computer-readable storage medium containing instructions that cause a program, in a data processing system having a JAVA property file including a text element in English, to perform a method comprising the steps of:

creating an extensible markup language file;

extracting the text element in English from the JAVA source code, the extracted text element including a context information that identifies a location of the text element in the English in the JAVA property file;

writing the text element in English into the extensible markup language file;

sending the text element in English to a translation program;

receiving a translation of the text element in a different natural language from the translation program;

merging the translation of the text element in the different natural language into the extensible markup language file at a merge location based on the context information such that the extensible markup language file includes the text element and the translation of the text element; and after merging the translation of the text element into the extensible markup language file, generating a temporary JAVA property file in English that includes the text element in English, but not the text element in the different natural language, and generating a temporary JAVA property file in the different natural language that includes the translation of the text element in the different natural language, but not the text element in English, to effect an executable version of the extensible markup language file in English and an executable version of the extensible markup language file in the different natural language.

35. A data processing system comprising:

a memory comprising a program that extracts a text element in a first natural language from a source code, the extracted text element including context information that identifies a location of the text element in the first natural language in the source code, obtains a translation of the extracted text element in a second natural language, merges the translation of the text element in the second natural language into the source code at a merge location based on the context information such that the source code includes the text element and the translation of the text element, and generates a single-natural-language version of the source code in the first natural language and a single-natural-language version of the source code in the second natural language after merging the translation of the text element into the source code; and a processing unit that runs the program.

36. A data processing system comprising:

means for extracting a text element in a first natural language from a source code, the extracted text element including context information that identifies a location of the text element in the first natural language in the source code;

means for obtaining a translation of the extracted text element in a second natural language;

means for merging the translation of the text element in the second natural language into the source code at a merge location based on the context information such that the source code includes the text element and the translation of the text element; and means for generating a single-natural-language version of the source code in the first natural language and a single-natural-language version of the source code in the second natural language after merging the translation of the text element into the source code.

* * * * *